US009275205B2

(12) United States Patent
Kamei et al.

(10) Patent No.: US 9,275,205 B2
(45) Date of Patent: Mar. 1, 2016

(54) MATERIAL OUTPUT SYSTEM FOR OUTPUTTING MEETING MATERIAL FOR PROSPECTIVE PARTICIPANT IN MEETING

(75) Inventors: Nobuo Kamei, Osaka (JP); Tomoyuki Okamoto, Kyoto (JP); Yasuji Takeuchi, Kobe (JP); Tomo Tsuboi, Itami (JP); Yoshiaki Shibuta, Amagasaki (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 556 days.

(21) Appl. No.: 13/106,240

(22) Filed: May 12, 2011

(65) Prior Publication Data

US 2011/0283345 A1 Nov. 17, 2011

(30) Foreign Application Priority Data

May 13, 2010 (JP) ................................. 2010-111459

(51) Int. Cl.
*G06F 21/31* (2013.01)
*G06F 21/34* (2013.01)
(Continued)

(52) U.S. Cl.
CPC ............... *G06F 21/31* (2013.01); *G06F 21/34* (2013.01); *G06F 21/608* (2013.01); *G06Q 10/109* (2013.01); *G06F 2221/2115* (2013.01); *G06F 2221/2151* (2013.01); *G06F 2221/2153* (2013.01)

(58) Field of Classification Search
CPC ..................................................... G06F 21/31
See application file for complete search history.

(56) References Cited

U.S. PATENT DOCUMENTS 5,664,063 A * 9/1997 Johnson et al. ................ 358/1.1
5,867,799 A * 2/1999 Lang et al.
(Continued)

FOREIGN PATENT DOCUMENTS

JP 2005-266977 A 9/2005
JP 2006-72848 A 3/2006
(Continued)

OTHER PUBLICATIONS

Kagal et al.; Trust-based security in pervasive computing environments; Published in: Computer (vol. 34 , Issue: 12)); pp. 154-157; Date of Publication: Dec. 2001; IEEE Xplore.*
(Continued)

*Primary Examiner* — Bradley Holder
(74) *Attorney, Agent, or Firm* — Buchanan Ingersoll & Rooney PC

(57) ABSTRACT

In a material output system, if it is determined that a meeting management server has stored therein meeting information in which an authenticated person is included in prospective participants in a meeting, in which an installation place of MFP that has performed authentication agrees with a meeting room where the meeting is held, and in which the present date and time is included in a meeting room reservation time, MFP is instructed to output a material saved in a location associated with the meeting information. If it is determined that such meeting information is not stored in the meeting management server, the material output system displays a screen to allow output of the material saved in the associated location, for at least one piece of meeting information in which the authenticated user is included in prospective participants in a meeting. Accordingly, the material can be promptly distributed to the participant in the meeting.

16 Claims, 16 Drawing Sheets

(51) Int. Cl.
*G06F 21/60* (2013.01)
*G06Q 10/10* (2012.01)

(56) References Cited

U.S. PATENT DOCUMENTS

| | | | | |
|---|---|---|---|---|
| 6,157,946 | A * | 12/2000 | Itakura et al. | 709/217 |
| 7,325,054 | B2 * | 1/2008 | Ishimoto | 709/224 |
| 7,797,642 | B1 * | 9/2010 | Karam et al. | 715/810 |
| 2002/0083114 | A1 * | 6/2002 | Mazzagatte | G06F 3/1204 718/100 |
| 2002/0089688 | A1 * | 7/2002 | Ferlitsch et al. | 358/1.15 |
| 2002/0198884 | A1 * | 12/2002 | Eisinger | 707/10 |
| 2006/0039025 | A1 * | 2/2006 | Krolczyk et al. | 358/1.15 |
| 2006/0053042 | A1 | 3/2006 | Yoshimura et al. | |
| 2007/0127065 | A1 * | 6/2007 | Nishizawa | 358/1.15 |
| 2008/0120293 | A1 * | 5/2008 | Morisawa | 707/5 |
| 2008/0181648 | A1 * | 7/2008 | Makishima | G03G 15/502 399/75 |
| 2009/0067000 | A1 | 3/2009 | Takiyama | |
| 2009/0113006 | A1 * | 4/2009 | McWana | 709/206 |

FOREIGN PATENT DOCUMENTS

| | | |
|---|---|---|
| JP | 2008-40716 A | 2/2008 |
| JP | 2009-70102 A | 4/2009 |

OTHER PUBLICATIONS

Hilbert et al.; Personalizing shared ubiquitous devices; Published in: Magazine interactions—Personalized shared devices Interactions Homepage archive; vol. 11 Issue 3, May + Jun. 2004; pp. 34-43; ACM Digital Library.*

* cited by examiner

FIG.5

MEETING INFORMATION IF1

| MEETING NAME | MEETING PLACE | MEETING ROOM RESERVATION DATE AND TIME | MEETING DATE AND TIME | MEETING MATERIAL SAVE LOCATION | PROSPECTIVE PARTICIPANT | PAPER ELECTRONIC DATA |
|---|---|---|---|---|---|---|
| xxx PROGRESS MEETING | OSAKA BRANCH: MEETING ROOM A | MARCH 2, 2009 (MON) 15:00-17:00 | MARCH 2, 2009 (MON) 15:10-17:00 | //MFP-1/ MEETING MATERIAL BOX/ xxx PROGRESS MEETING | A | ELECTRONIC DATA |
| | | | | | B | ELECTRONIC DATA |
| | | | | | C | ELECTRONIC DATA |
| | | | | | D | ELECTRONIC DATA |
| | | | | | E | PAPER |
| | | | | | F | PAPER |
| | | | | | G | PAPER |
| | | | | | H | PAPER |
| | | | | | I | PAPER |
| | | | | | J | PAPER |
| | TOKYO BRANCH: MEETING ROOM 1 | MARCH 2, 2009 (MON) 15:00-17:00 | | | K | ELECTRONIC DATA |
| | | | | | L | PAPER |
| | | | | | M | ELECTRONIC DATA |
| | | | | | N | PAPER |
| | | | | | O | PAPER |
| | | | | | P | PAPER |
| *** REPORT MEETING | OSAKA BRANCH: MEETING ROOM B | MARCH 2, 2009 (MON) 17:00-19:00 | MARCH 2, 2009 (MON) 17:10-19:00 | //MFP-1/ MEETING MATERIAL BOX/ *** REPORT MEETING | XX | PAPER |
| | | | | | ZZ | PAPER |
| | | | | | YY | PAPER |
| | | | | | WW | PAPER |
| yyy MONTHLY REPORT | OSAKA BRANCH: MEETING ROOM A | MARCH 3, 2009 (TUE) 10:00-12:00 | MARCH 3, 2009 (TUE) 10:10-12:00 | //MFP-1/ MEETING MATERIAL BOX/ yyy MONTHLY REPORT | A | ELECTRONIC DATA |
| | | | | | B | ELECTRONIC DATA |
| | | | | | C | ELECTRONIC DATA |
| | | | | | D | PAPER |
| | | | | | E | PAPER |
| | | | | | F | PAPER |
| | | | | | G | PAPER |
| | | | | | H | PAPER |
| | | | | | I | PAPER |
| | | | | | J | PAPER |
| | TOKYO BRANCH: MEETING ROOM 1 | MARCH 3, 2009 (TUE) 10:00-12:00 | | | K | ELECTRONIC DATA |
| | | | | | L | PAPER |
| | | | | | M | ELECTRONIC DATA |
| | | | | | N | PAPER |
| | | | | | O | PAPER |
| | | | | | P | PAPER |
| aaa PROGRESS MEETING | OSAKA BRANCH: MEETING ROOM B | MARCH 3, 2009 (TUE) 10:00-12:00 | MARCH 3, 2009 (TUE) 10:10-12:00 | //MFP-1/ MEETING MATERIAL BOX/ aaa PROGRESS MEETING | XX | PAPER |
| | | | | | ZZ | PAPER |
| | | | | | YY | PAPER |
| | | | | | WW | PAPER |
| bbb PROGRESS MEETING | OSAKA BRANCH: MEETING ROOM B | MARCH 3, 2009 (TUE) 15:00-17:00 | MARCH 3, 2009 (TUE) 15:10-17:00 | //MFP-1/ MEETING MATERIAL BOX/ bbb PROGRESS MEETING | A | PAPER |
| | | | | | D | PAPER |
| | | | | | C | PAPER |
| | | | | | F | PAPER |

MFP INFORMATION IF2

| MFP INSTALLATION PLACE | MFP | PRINTING AVAILABLE PLACE |
|---|---|---|
| OSAKA BRANCH: OFFICE ROOM | MFP-1 | OSAKA BRANCH: OFFICE ROOM |
| | | OSAKA BRANCH: MEETING ROOM A |
| | | OSAKA BRANCH: MEETING ROOM B |
| OSAKA BRANCH: MEETING ROOM A | MFP-2 | OSAKA BRANCH: MEETING ROOM A |
| | | OSAKA BRANCH: OFFICE ROOM |
| | | OSAKA BRANCH: MEETING ROOM B |
| OSAKA BRANCH: MEETING ROOM B | MFP-3 | OSAKA BRANCH: MEETING ROOM B |
| | | OSAKA BRANCH: OFFICE ROOM |
| TOKYO BRANCH: OFFICE ROOM | MFP-4 | TOKYO BRANCH: OFFICE ROOM |
| | | TOKYO BRANCH: MEETING ROOM 1 |
| TOKYO BRANCH: MEETING ROOM 1 | MFP-5 | TOKYO BRANCH: MEETING ROOM 1 |
| | | TOKYO BRANCH: OFFICE ROOM |

FIG.7

PERSONAL IDENTIFICATION INFORMATION IF3

| USER ID | USER NAME | PASSWORD |
|---|---|---|
| 0001 | A | 1al2c |
| 0002 | B | i2jy4 |
| 0003 | C | 7k3n9 |
| 0004 | D | b1m42 |
| 0005 | E | g6gx1 |
| ⋮ | ⋮ | ⋮ |

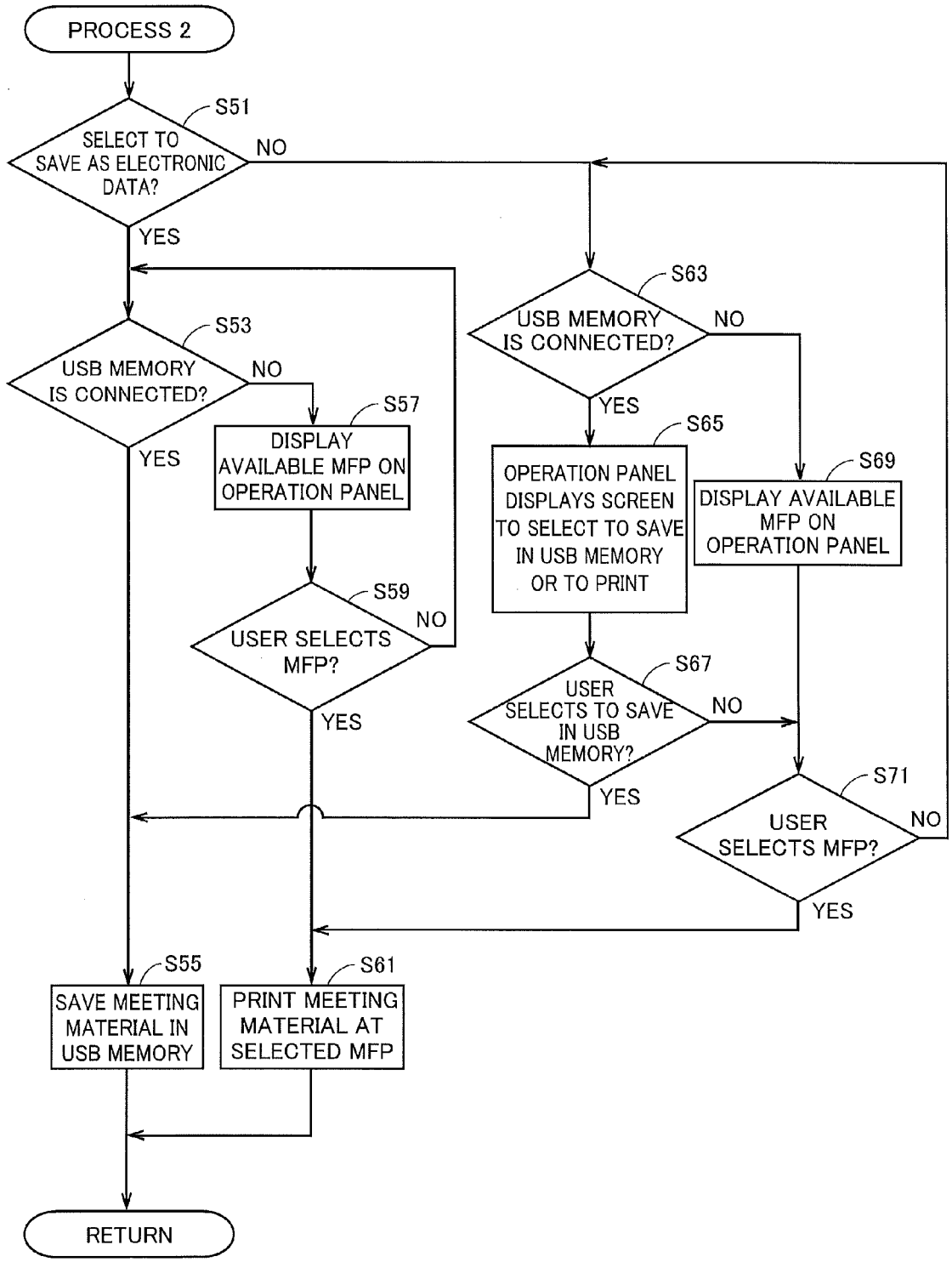

FIG.14

YOU ARE IN DIFFERENT MEETING ROOM.
MEETING WILL BE HELD IN 'MEETING ROOM A'.

AT WHICH MFP DO YOU WANT TO PRINT MEETING MATERIAL?

YOU HAVE "TEN MINUTES" BEFORE START OF MEETING.

| PLACE TO PRINT | PRINTING TIME | TIME TAKEN TO COMPLETE PRINTING | |
|---|---|---|---|
| THIS MFP | 1 MIN | 1 MIN | PRINT |
| 「MEETING ROOM A」 | 1 MIN | 11 MIN | PRINT |
| 「MEETING ROOM B」 | 2 MIN | 2 MIN | PRINT |

FIG.15

YOU ARE IN DIFFERENT MEETING ROOM.
MEETING WILL BE HELD IN 'MEETING ROOM A'.

AT WHICH MFP DO YOU WANT TO PRINT MEETING MATERIAL?

YOU HAVE "TEN MINUTES" BEFORE START OF MEETING.

| PLACE TO PRINT | PRINTING TIME | TIME TAKEN TO COMPLETE PRINTING | |
|---|---|---|---|
| THIS MFP | 1 MIN | 1 MIN | PRINT |
| 「MEETING ROOM A」 | 1 MIN | 11 MIN | PRINT |
| 「MEETING ROOM B」 | 2 MIN | 2 MIN | PRINT |
| TO SAVE ELECTRONIC DATA IN USB MEMORY | | | GO |

FIG.17

| MEETING NAME | MEETING PLACE | MEETING RESERVATION DATE AND TIME | MEETING DATE AND TIME | MEETING MATERIAL SAVE LOCATION |
|---|---|---|---|---|
| xxx PROGRESS MEETING | OSAKA BRANCH: MEETING ROOM A | MARCH 2, 2009 (MON) 15:00-17:00 | MARCH 2, 2009 (MON) 15:10-17:00 | //MFP-1/ MEETING MATERIAL BOX/ xxx PROGRESS MEETING |
| | TOKYO BRANCH: MEETING ROOM 1 | MARCH 2, 2009 (MON) 15:00-17:00 | | |
| yyy MONTHLY REPORT | OSAKA BRANCH: MEETING ROOM A | MARCH 3, 2009 (TUE) 10:00-12:00 | MARCH 3, 2009 (TUE) 10:10-12:00 | //MFP-1/ MEETING MATERIAL BOX/ yyy MONTHLY REPORT |
| | TOKYO BRANCH: MEETING ROOM 1 | MARCH 3, 2009 (TUE) 10:00-12:00 | | |
| bbb PROGRESS MEETING | OSAKA BRANCH: MEETING ROOM B | MARCH 3, 2009 (TUE) 15:00-17:00 | MARCH 3, 2009 (TUE) 15:10-17:00 | //MFP-1/ MEETING MATERIAL BOX/ bbb PROGRESS MEETING |
| ccc REPORT | OSAKA BRANCH: MEETING ROOM B | MARCH 3, 2009 (TUE) 17:00-19:00 | MARCH 3, 2009 (TUE) 17:10-19:00 | //MFP-1/ MEETING MATERIAL BOX/ ccc REPORT |
| ddd REGULAR MEETING | OSAKA BRANCH: MEETING ROOM B | MARCH 5, 2009 (THU) 13:00-14:00 | MARCH 5, 2009 (THU) 13:10-14:00 | //MFP-1/ MEETING MATERIAL BOX/ bbb REGULAR MEETING |
| zzz MEETING | OSAKA BRANCH: MEETING ROOM A | MARCH 5, 2009 (THU) 15:00-17:00 | MARCH 5, 2009 (THU) 15:10-17:00 | //MFP-1/ MEETING MATERIAL BOX/ zzz MEETING |
| | TOKYO BRANCH: MEETING ROOM 1 | MARCH 5, 2009 (THU) 15:00-17:00 | | |
| eee REPORT MEETING | OSAKA BRANCH: MEETING ROOM B | MARCH 6, 2009 (FRI) 15:00-17:00 | MARCH 6, 2009 (FRI) 15:10-17:00 | //MFP-1/ MEETING MATERIAL BOX/ eee REPORT MEETING |
| fff PROGRESS MEETING | OSAKA BRANCH: MEETING ROOM B | MARCH 9, 2009 (MON) 10:00-12:00 | MARCH 9, 2009 (MON) 10:10-12:00 | //MFP-1/ MEETING MATERIAL BOX/ fff PROGRESS MEETING |

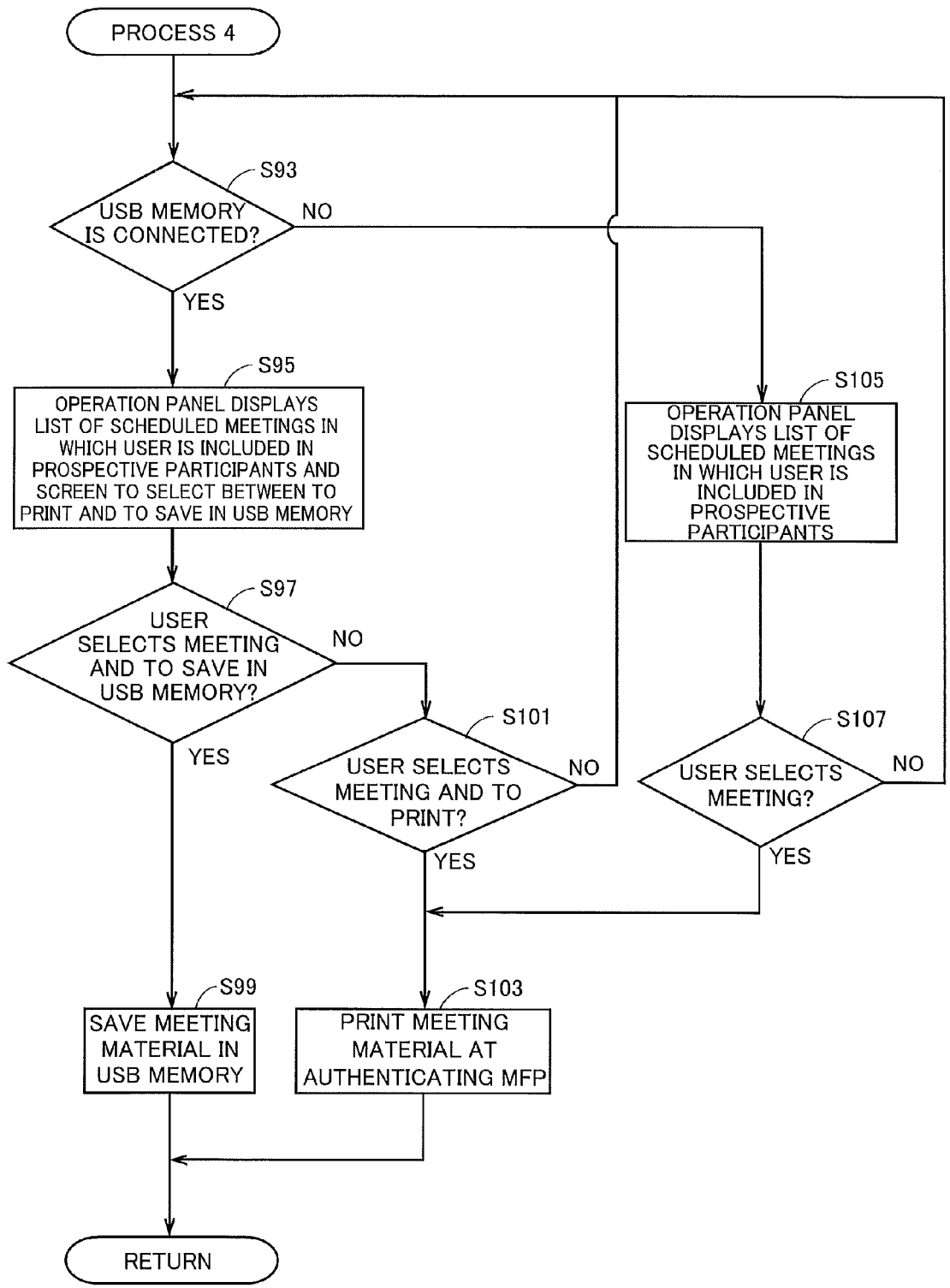

FIG.21

WHICH MEETING MATERIAL DO YOU WANT TO SAVE IN USB MEMORY? — 31

PAPER PRINTOUT — 231
SAVE IN USB MEMORY — 233

| MEETING NAME | MEETING DATE AND TIME | |
|---|---|---|
| xxx PROGRESS MEETING | MARCH 2, 2009 (MON) 15:10-17:00 | GO |
| yyy MONTHLY REPORT | MARCH 3, 2009 (TUE) 10:10-12:00 | GO |
| bbb PROGRESS MEETING | MARCH 3, 2009 (TUE) 15:10-17:00 | GO |
| ccc REPORT | MARCH 3, 2009 (TUE) 17:10-19:00 | GO |
| ddd REGULAR MEETING | MARCH 5, 2009 (THU) 13:10-14:00 | GO |

WHICH MEETING MATERIAL DO YOU WANT TO PRINT OUT?

| MEETING NAME | MEETING DATE AND TIME | |
|---|---|---|
| xxx PROGRESS MEETING | MARCH 2, 2009 (MON) 15:10-17:00 | PRINT |
| yyy MONTHLY REPORT | MARCH 3, 2009 (TUE) 10:10-12:00 | PRINT |
| bbb PROGRESS MEETING | MARCH 3, 2009 (TUE) 15:10-17:00 | PRINT |
| ccc REPORT | MARCH 3, 2009 (TUE) 17:10-19:00 | PRINT |
| ddd REGULAR MEETING | MARCH 5, 2009 (THU) 13:10-14:00 | PRINT |

— 31, 211, 212, 235, 213, 214, 235a, 215

MATERIAL OUTPUT SYSTEM FOR OUTPUTTING MEETING MATERIAL FOR PROSPECTIVE PARTICIPANT IN MEETING

This application is based on Japanese Patent Application No. 2010-111459 filed with Japan Patent Office on May 13, 2010, the entire content of which is hereby incorporated by reference.

BACKGROUND OF THE INVENTION

1. Field of the Invention

The present invention relates to a material output system, a material output apparatus, and a material output system controlling method. More particularly, the present invention relates to a material output system, a material output apparatus, and a material output system controlling method for outputting meeting materials for prospective participants in meetings.

2. Description of the Background Art

Generally, when meeting materials are distributed in the form of paper (sheets) to meeting participants, the meeting organizer predicts the required number of meeting materials in advance, prints out the required number of materials or the required number plus some extra, and distributes the printouts to the participants at the start of the meeting. In this method, however, the extra printouts and the printouts for the participants who are actually absent from the meeting become redundant, resulting in print waste and paper waste. In order to solve such a problem, it has been conventionally proposed that meeting participants produce printouts on their own in advance or that a printout for a participant is produced every time the participant comes to a meeting place.

For example, Document 1 listed below discloses a material distributing apparatus capable of providing participants with a material for a meeting while saving paper resources and making a material preparation time longer than before. In response to input of a user ID, the material distributing apparatus extracts a meeting the user is expected to attend, from a meeting information master in which information for meetings to be held is stored. The material distributing apparatus then displays an extracted-meeting screen including a list of the extracted meetings on an operation panel. Then, when the user selects, from the list, the name of the meeting that he now plans to attend, the material distributing apparatus outputs a material in an output manner as desired by the user.

Document 2 listed below discloses an image forming system, which can manage print history information for each meeting participant and prints one copy of a meeting material for each participant onsite when the participant arrives at a meeting room. In this image forming system, if a meeting participant owns an RFID tag and is present in a meeting room, an RFID reader reads out information of the RFID tag in a noncontact manner. The read identification information of the RFID tag is received by a printer server. The printer server determines whether the owner is a meeting participant based on the information of the RFID tag and determines whether a print request is made for the participant. It is also determined whether a printout has already been produced based on the print history. If the owner is a meeting participant and if a printout has not yet been produced, the printer server obtains print data and transmits the print data to a printer. The printer server then saves the print history as the print request is made.

Document 3 listed below discloses a material printing system capable of printing and distributing materials in line with actual meeting participants. When the user who wishes to attend a prescribed meeting enters his identification information into an authentication device installed in a meeting room, a meeting specifying means refers to a meeting information storing means to obtain identification information of a meeting whose material printable time includes the present time, among meetings to be held in that meeting room. If the user is a prospective participant in the meeting, a material printing means outputs print data to a printer in that meeting room. On the other hand, meeting participants can access a meeting management server in advance from their terminal devices to print out meeting materials using another printer.

Document 1: Japanese Laid-Open Patent Publication No. 2006-72848

Document 2: Japanese Laid-Open Patent Publication No. 2005-266977

Document 3: Japanese Laid-Open Patent Publication No. 2008-40716

However, in the material distributing apparatus disclosed in Document 1, each individual meeting participant is required to select all the meeting materials from the list of the extracted meetings and print the materials. Therefore, it is extremely cumbersome to distribute meeting materials to participants.

In the image forming system disclosed in Document 2, the participants cannot produce printouts unless they are present in the meeting room, and they cannot produce printouts at a place other than the meeting place or cannot give a print instruction from a place other than the meeting place. Therefore, if there are many participants in a meeting or if a large number of copies of a meeting material is to be printed, the wait time for printing becomes long and the participants may be late for the start of the meeting.

In Document 3 disclosed in the material printing system, in order to obtain a meeting material in advance, meeting participants access the meeting management server on their own to search for the meeting material in the meeting management server. Thus, it is extremely cumbersome for participants to obtain a meeting material in advance.

SUMMARY OF THE INVENTION

The present invention is made to solve the aforementioned problems. An object of the invention is to provide a material output system, a material output apparatus, and a material output system controlling method to allow for prompt distribution of materials to meeting participants.

A material output system according to an aspect of the present invention includes: a meeting information storage unit for storing at least one piece of meeting information in which prospective participants in a meeting, a meeting room where the meeting is held, and a meeting room use time in the meeting, and a location to save a material used in the meeting, are associated with each other; a plurality of output units for outputting the material, each including an authentication unit for performing authentication of a user; a correspondence storage unit for storing a correspondence between the plurality of output units and meeting rooms associated with the plurality of output units; a first output instruction unit for, if it is determined, based on the meeting information and the correspondence, that the meeting information storage unit has stored therein meeting information in which a user authenticated by the authentication unit is included in prospective participants in a meeting, in which a meeting room associated with an output unit that has performed authentication among the plurality of output units agrees with a meeting room where the meeting is held, and in which the present date and time is included in a meeting room use time in the meeting, instructing the output unit that has performed authentication to output a material saved in the associated location for that meeting information; a display unit for, if it is determined that the meeting information storage unit has stored therein no meeting information in which the authenticated user is included in prospective participants in a meeting, in which a meeting room associated with the output unit that has performed authentication agrees with a meeting room where the meeting is held, and in which the present date and time is included in a meeting room use time in the meeting, displaying a screen to allow output of a material saved in the associated location, for at least one piece of meeting information in which the authenticated user is included in prospective participants in a meeting; and a second output instruction unit for, if the screen to allow output of a material is displayed, instructing the output unit that has performed authentication to output a material saved in the associated location, for at least one piece of meeting information in which the authenticated user is included in participants in a meeting, based on an instruction from the authenticated user.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 shows an example of a database stored as meeting information.

FIG. 6 shows an example of a database stored as MFP information.

FIG. 7 shows an example of a database stored as personal identification information.

FIG. 13 is a flowchart showing a subroutine of a process 2 in FIG. 8 in detail.

FIG. 14 shows an example of a screen appearing on the liquid crystal display of the operation panel in step S57 or step S69 in FIG. 13.

FIG. 15 shows an example of a screen appearing on the liquid crystal display of the operation panel in step S65 in FIG. 13.

FIG. 17 schematically shows a list of future meeting information in which a user called "A" is included as a meeting participant.

FIG. 20 is a flowchart showing a subroutine of a process 4 in FIG. 8 in detail.

FIG. 21 shows an example of a screen appearing on the liquid crystal display of the operation panel in step S95 in FIG. 20.

FIG. 22 shows an example of a screen appearing on the liquid crystal display of the operation panel in step S105 in FIG. 20.

DESCRIPTION OF THE PREFERRED EMBODIMENTS

In the following, an embodiment of the present invention will be described based on the figures.

In a material output system in the present embodiment, in order to print a meeting material, a user who is a meeting participant performs personal authentication using, for example, a USB (Universal Serial Bus) memory or an authentication card at an MFP (Multi Function Peripheral) serving as an image forming apparatus. If the user is authenticated, the material output system varies processing provided to the user, depending on whether the location of the MFP in which the authentication has been performed and the present time agree with the meeting place and the meeting time, respectively, stored in a meeting management server.

[Configuration of Material Output System]

Figure 1:
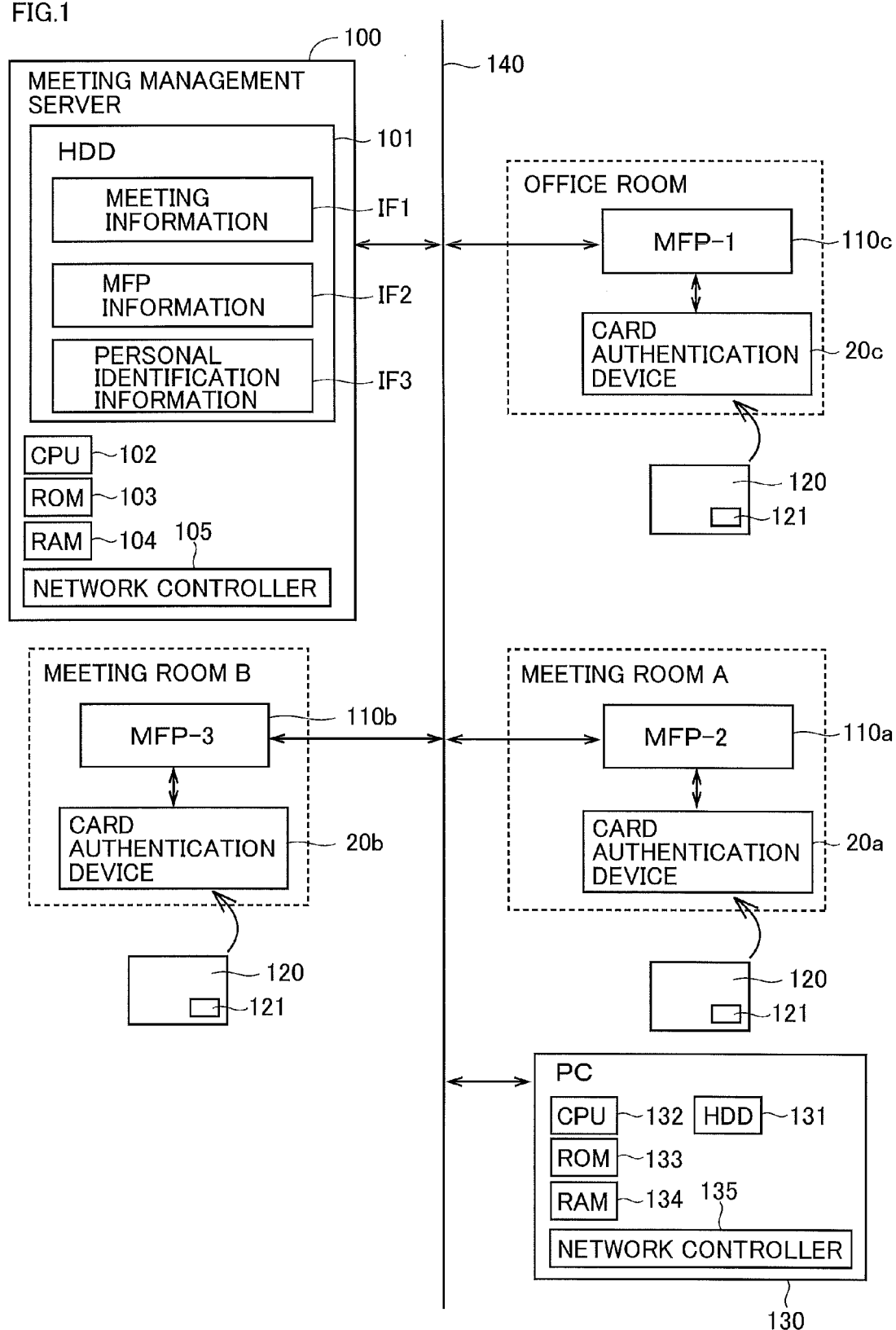
FIG. 1 is a block diagram showing a configuration of a material output system in an embodiment of the present invention.

Referring to FIG. 1, a material output system in the present embodiment includes, for example, a meeting management server 100, MFPs (an example of the material output apparatus) 110a, 110b, 110c (MFPs 110a, 110b, 110c may also be collectively referred to as MFP 110 hereinafter), card authentication devices 20a, 20b, 20c (an example of an authentication unit) (card authentication devices 20a, 20b, 20c may also be collectively referred to as card authentication device 20 hereinafter), and a personal computer (PC) 130. A plurality of MFPs 110 each have an authentication unit such as card authentication device 20 for specifying an individual person and are connected with each other via a network 140. Each MFP 110, meeting management server 100, and PC 130 are connected with each other via network 140.

In the environment according to the present embodiment, a plurality of MFPs each having a card authentication device (authentication unit) for specifying an individual person using a USB memory or an authentication card are connected via a network. Specifically, it is assumed that MFP 110a (MFP-2) and card authentication device 20a are installed in a meeting room A, MFP 110b (MFP-3) and card authentication device 20b are installed in a meeting room B, and MFP 110c (MFP-1) and card authentication device 20c are installed in an office room. Meeting room A, meeting room B, and the office room are examples of meeting rooms.

Meeting management server 100 includes a hard disk drive (HDD) 101. HDD 101 stores meeting information IF1 which is a database concerning meeting information, MFP information IF2 which is a database concerning the correspondence between MFP and meeting rooms, and personal identification information IF3 which is a database concerning personal identification information. As will be described later, meeting information IF1 is meeting information in which a meeting place, a meeting time, prospective participants, a location to save a meeting material, and the like are associated with each other. MFP information IF2 is information in which a place such as a meeting room and each of a plurality of MFP are associated with each other. Meeting management server 100 may be a personal computer (PC) including a PC body, including a CPU (Central Processing Unit) 102, a ROM (Read Only Memory) 103, a RAM (Random Access Memory) 104, and a network controller 105, a monitor, and an input device such as a keyboard and a mouse.

MFP 110 is an image forming apparatus including a scanner function, a facsimile function, a copy function, a printer function, a data communication function, and a server function. When the printer function is used, a meeting material can be output in the form of a paper printout. MFP 110 also has a terminal for connecting, for example, a USB memory, and MFP 110 can output a material as an electronic file to a USB memory through this terminal.

Card authentication device 20 performs personal authentication using an ID card (authentication card). More specifically, card authentication device 20 communicates with an ID card 120 owned by a user in a contact or noncontact manner to accept input of a user ID stored in a storage unit 121 of ID card 120 from the user and sends the accepted user ID to CPU 11 (FIG. 3) of a main control unit 2. Card authentication device 20 has an antenna and a radio circuit for producing a magnetic field for communication with ID card 120 and a circuit for demodulating and decoding information received from the ID card.

PC 130 is, for example, a terminal device for a meeting organizer and is used for the meeting organizer to create a material used in a meeting and meeting information. PC 130 is a personal computer including a PC body including a HDD 131, a CPU 132, a ROM 133, a RAM 134, and a network controller 135, and a monitor, and an input device such as a keyboard and a mouse. PC 130 is installed with application software for creating documents and graphics in its storage device. As a terminal device for the meeting organizer, PC 130 may be replaced by a workstation, a portable information terminal, or a mobile phone terminal, or the like. Alternatively, instead of PC 130, meeting management server 100 or MFP 110 may be used as a terminal device for the meeting organizer.

Network 140 is a wired or wireless LAN (Local Area Network). Network 140 is connected using TCP/IP (Transmission Control Protocol/Internet Protocol). The devices connected to network 140 can mutually communicate various data. The devices may be connected using a wide area network such as the Internet or a dedicated line, instead of network 140.

Although MFP is shown as a material output apparatus in the present embodiment, the material output apparatus of the present invention may otherwise be a facsimile machine, a copier, a printer, a personal computer, a portable information terminal, a mobile phone terminal, or the like.

[Configuration of MFP]

Figure 2:
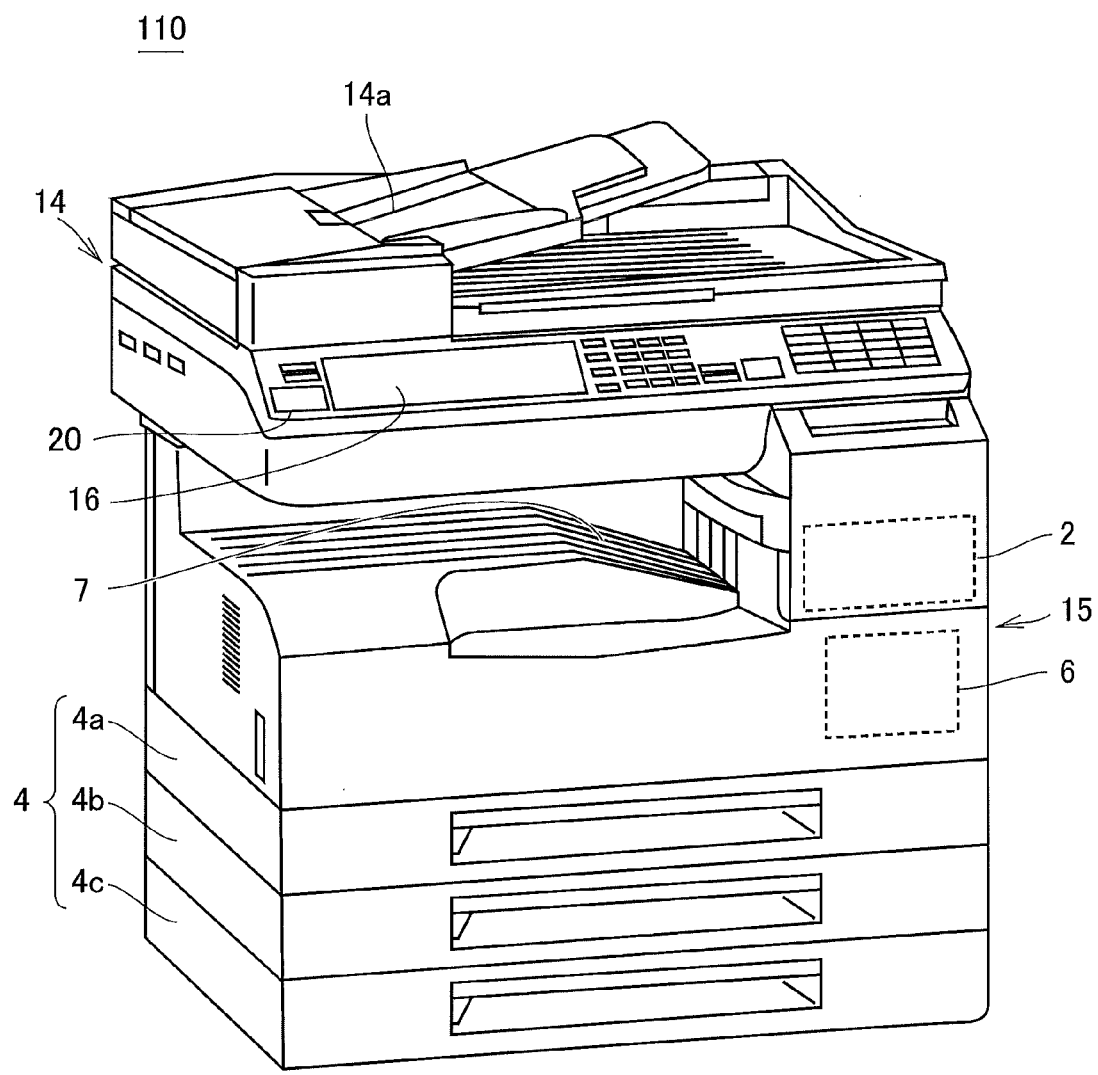
FIG. 2 is a perspective view showing a configuration of MFP in an embodiment of the present invention.

FIG. 2 is a perspective view of MFP in an embodiment of the present invention.

Referring to FIG. 2, MFP 110 includes a main control unit 2, a paper-feeding cassette 4, a power supply unit 6, a paper-output tray 7, a scanner unit 14, a printer unit 15, an operation panel 16, and a card authentication device 20.

Main control unit 2 performs sequence control on the entire processing including scanning, printing, transmission, and reception, and controls the operation of each unit of MFP 110. Main control unit 2 includes, for example, a CPU and a storage medium such as ROM and RAM. Main control unit 2 is connected to each unit, for example, through a system bus.

Paper-feeding cassette 4 has three paper-feeding cassettes 4a, 4b, 4c. Each paper-feeding cassette 4 is loaded with paper of a size different from another (for example, B5 size, A4 size, A3 size, etc.) Paper-feeding cassette 4 is removably arranged in the casing of MFP 110 at the bottom of MFP 110. During printing, paper loaded in each paper-feeding cassette 4 is fed one-by-one from paper-feeding cassette 4 and sent to printer unit 15. It is noted that the number of paper-feeding cassettes 4 is not limited to three and may be three or more or three or less.

Power supply unit 6 is provided inside the casing of MFP 110. Power supply unit 6 is connected to a commercial power source. Power supply unit 6 supplies power to main control unit 2, printer unit 15, and the like, based on the commercial power source.

Paper-output tray 7 is arranged at a part of the casing of MFP 110 which is above where printer unit 15 is housed and below where scanner unit 14 is arranged. Paper having an image formed thereon by printer unit 15 is discharged from the inside of the casing to paper-output tray 7.

Scanner unit 14 is arranged on the top of the casing of MFP 110. Scanner unit 14 has an ADF (Automatic Document Feeder) 14a. Scanner unit 14 executes the scanner function. Scanner unit 14 scans a document arranged on a transparent platen using a contact image sensor to read the document as image data. Scanner unit 14 scans the image data of plural sheets of a document set on the document tray and successively fed by ADF 14a, using the contact image sensor. The scanned image data is converted, for example, into an application data format in main control unit 2 and then stored, for example, into HDD of main control unit 2.

Printer unit 15 is mainly configured with a toner image formation unit, a paper transfer unit, and a fixing device. Printer unit 15 forms an image on paper, for example, by electrophotography. Printer unit 15 is configured to be able to combine four color images in tandem and form a color image on paper.

The toner image formation unit is mainly configured with photoconductors for C (cyan), M (magenta), Y (yellow), and K (black), an intermediate transfer belt to which a toner image is transferred from the photoconductor (primary transfer), and a transfer unit for transferring an image from the intermediate transfer belt to paper (secondary transfer).

The paper transfer unit is mainly configured with a paper-feeding roller, a transfer roller, and a motor for driving them. The paper transfer unit feeds paper from paper-feeding cassette 4 and transfers the paper inside the casing of MFP 110. The paper transfer unit also ejects paper having an image formed thereon from the casing of MFP 110 to paper-output tray 7 or the like.

The fixing device has a heating roller and a pressing roller. The fixing device transfers paper with a toner image sandwiched between the heating roller and the pressing roller for heating and pressing the paper. The fixing device thus fuses the toner adhered on the paper and fixes the toner on the paper thereby forming an image on the paper.

Card authentication device 20 is arranged, for example, on the left end on the upper front side of MFP 110. Card authentication device 20 may be built in MFP 110 as shown in FIG. 2. Alternatively, card authentication device 20 may be provided in the vicinity of MFP 110 independently from MFP 110 and may be connected to be able to communicate with MFP 110 through a USB cable.

Figure 3:
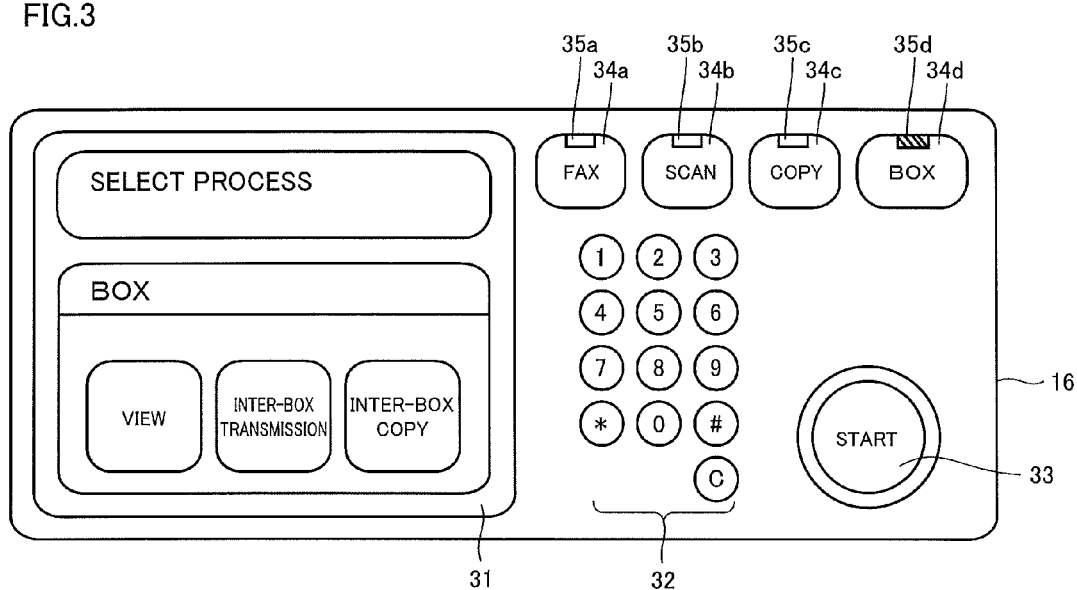
FIG. 3 illustrates an exemplary configuration of a display panel.

Operation panel 16 is arranged to the right of card authentication device 20 on the upper front side of MFP 110. FIG. 3 shows an exemplary configuration of a display panel.

Referring to FIG. 3, operation panel 16 includes a liquid crystal display 31, ten-key pad 32, a job start key 33, mode select keys 34a, 34b, 34c, and 34d, and LED 35a, 35b, 35c, and 35d for displaying the selected mode. Liquid crystal display 31 is a touch panel located on the left side in FIG. 3. Liquid crystal display 31 can be used for a variety of displays and a variety of settings. More specifically, liquid crystal display 31 displays a guide screen to the users or displays an operation button to accept the users' instruction through a touch operation. Liquid crystal display 31 is controlled by main control unit 2 (FIG. 2) for displaying. When the user operates the operation button of operation panel 16, liquid crystal display 31 transmits an operation signal or a prescribed command to main control unit 2 in accordance with the operation. In other words, the user can allow MFP 110 to execute a variety of operations by operating operation panel 16.

Ten-key pad 32 is located in the middle in FIG. 3 and includes operation buttons such as numerals 1-9, # and *, and C (clear key). Operation panel 16 accepts entry of numbers, for example, such as the number of sheets for printing, in response to the user pressing each operation button of ten-key pad 32. Job start key 33 is located at the lower right in FIG. 3. Operation panel 16 accepts an instruction to start a job in response to the user pressing job start key 33. Mode select keys 34a, 34b, 34c, and 34d are located at the top in FIG. 3 and associated with operation modes of a facsimile function, a scan function, a copy function, and BOX processing, respectively. When the user presses one of mode select keys 34a, 34b, 34c, and 34d, operation panel 16 accepts the selected operation mode associated with the pressed mode select key. LED 35a, 35b, 35c, and 35d are associated with mode select keys 34a, 34b, 34c, and 34d, respectively, and illuminate to display the currently selected mode. In FIG. 3, the mode "BOX" of the process using BOX of MFP 110 is selected and LED 35d illuminates. In this case, liquid crystal display 31 displays a screen to ask the user to select the desired process from among the process of viewing data stored in BOX, the process of transmitting data in BOX of MFP 110 to BOX of another MFP, and the process of copying data in BOX of MFP 110 to BOX of another MFP. Each input of main control unit 2 and liquid crystal display unit 31 are notified of the operation accepted from each of ten-key pad 32, job start key 33, and mode select keys 34a, 34b, 34c, 34d.

Operation panel 16 may also accept entry of personal identification information (for example, user ID and password) from the user.

Figure 4:
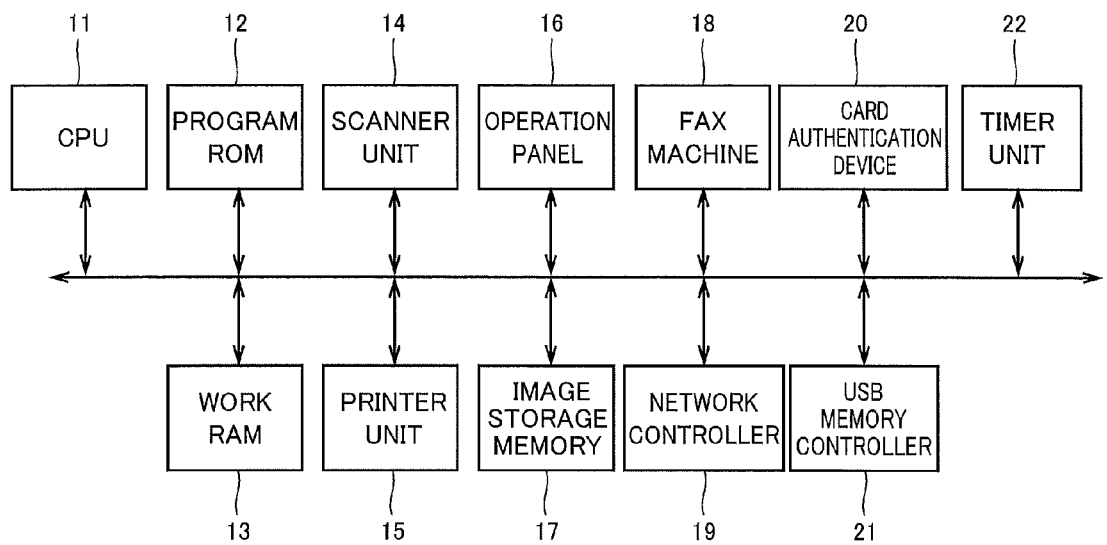
FIG. 4 is a block diagram showing a system configuration of the entire MFP.

FIG. 4 is a block diagram showing the entire system configuration of MFP.

Referring to FIG. 4, MFP 110 includes a CPU 11, a program ROM 12, a work RAM 13, scanner unit 14, printer unit 15, operation panel 16, an image storage memory 17, a FAX (facsimile) machine 18, a network controller 19, card authentication device 20, a USB memory controller 21, and a timer unit 22. Scanner unit 14, printer unit 15, operation panel 16, and card authentication device 20 correspond to the configuration shown in FIG. 2.

CPU 11 perform control on the entire MFP, such as a scan job, a copy job, and a print job. CPU 11 performs a prescribed process to read data in program ROM 12 and write data into program ROM 12.

Program ROM 12 is, for example, a flash ROM (flash memory). A variety of programs for performing operations of MFP 110, including a program for the material output processing, and a variety of fixed data are stored in program ROM 12. Program ROM 12 may be an unwritable one.

Work RAM 13 is a main memory of CPU 11. Work RAM 13 is used to store data necessary for CPU 11 to execute a control program.

Image storage memory 17 is, for example, an HDD for storing data such as print data externally sent through network controller 19 and image data scanned by scanner unit 14. Image storage memory 17 also stores data of materials used in meetings. Such data may be saved as data in BOX of MFP 110 shown in FIG. 3. Instead of the meeting management server, image storage memory 17 may store meeting information IF1, MFP information IF2, or personal identification information IF3.

FAX machine 18 receives facsimile data from an external FAX machine and accumulates the received data, for example, in image storage memory 17. FAX machine 18 also transmits, for example, a document image scanned by scanner unit 14 as facsimile data to an external FAX machine.

Network controller 19 communicates with an external device such as meeting management server 100, another MFP 110, or PC 130 through LAN using a communication protocol such as TCP/IP, in accordance with an instruction from CPU 11.

USB memory controller 21 communicates with an external image storage device such as a USB memory card, a digital camera, and an external HDD. When a USB memory card with a personal authentication function is attached to MFP 110, USB memory controller 21 may read out personal identification information from the USB memory card to identify the person through personal authentication.

Timer unit 22 holds the present date and time. Timer unit 22 always holds the data by means of a dedicated backup power supply even when MFP 110 is powered off.

[Meeting Information]

FIG. 5 shows an example of a database stored as meeting information.

Referring to FIG. 5, HDD 101 of meeting management server 100 (FIG. 1) stores at least one piece of meeting information as meeting information IF1. In meeting information IF1, in the horizontal direction (row direction) of the table, the following items are associated with each other for one meeting: "meeting name," "meeting place" (a meeting room where a meeting is held), "meeting room reservation date and time" (a meeting room use time in a meeting), "meeting date and time" (the time during which a meeting is held), "meeting material save location" (a location to save a material used in a meeting), "prospective participants" (prospective participants in a meeting), and "paper/electronic data" (in which form each prospective participant wishes to output a meeting material, either a paper printout or electronic data). In the vertical direction (column direction) of the table, meeting information is arranged in the order of time in which meetings are held.

As is understood from the meeting information in FIG. 5, for example, for a meeting with a meeting name "* report meeting," a meeting room B at Osaka branch is reserved from 17:00 to 19:00 on Mar. 2, 2009 (Mon). It is also understood that this meeting is to be held from 17:10 to 19:00 on Mar. 2, 2009 (Mon). It is further understood that the material for this meeting is saved with a file name "* report meeting" in a folder named a meeting material BOX in the image storage memory of MFP-1 (MFP 110c in FIG. 1). It is also understood that the prospective participants in the meeting are XX, ZZ, YY, and WW, and all of those prospective participants wish to output the material in the form of a paper printout.

The meeting information is saved as meeting information IF1 in HDD 101 of meeting management server 100 (FIG. 1) before the start of a meeting. The meeting information is created, for example, by the organizer of the meeting accessing HDD 101 of meeting management server 100 from PC 130 via network 140 and entering each item in the database of meeting information IF1. The material used in the meeting is also created, for example, by the organizer of the meeting before the start of the meeting. The meeting information saved as meeting information IF1 may be deleted automatically (without the organizer's instruction) from HDD 101 immediately after the end of the meeting or after a lapse of a certain time period.

It is noted that, in place of the name of a prospective participant, information for identifying a prospective participant (for example, user ID) may be stored as meeting information.

[MFP Information]

FIG. 6 shows an example of a database stored as MFP information.

Referring to FIG. 6, HDD 101 of meeting management server 100 (FIG. 1) stores at least one piece of MFP information as MFP information IF2. The MFP information refers to information concerning the correspondence between an MFP and a meeting room where that MFP is installed. In MFP information IF2, in the horizontal direction (row direction) of the table, the following items are associated with each other for each MFP: "MFP installation place," "MFP" (the name of an individual MFP), and "the printing available place" (the place where an MFP available for printing the material is installed, instead of the MFP designated by "MFP installation place"). In the vertical direction (column direction) of the table, MFP information is arranged from top down in the increasing order of the numbers assigned to the names of MFP. It is noted that the MFP information at least associates MFPs with meeting rooms.

As is understood from the MFP information in FIG. 6, for example, an MFP having the name "MFP-1" is installed in the office room at Osaka branch, and this MFP is available for printing out materials for meetings held in the office room at Osaka branch, meeting room A at Osaka branch, and meeting room B at Osaka branch. Such a meeting room as in Tokyo branch which is remote from Osaka branch is not included in the printing available place for this MFP.

The MFP information is created, for example, by the administrator of the material output system entering each item at the time of initial settings of the material output system (or before the start of a meeting) and is saved as MFP information IF2 in HDD 101 of meeting management server 100.

[Personal Identification Information]

FIG. 7 shows an example of a database stored as personal identification information.

Referring to FIG. 7, HDD 101 of meeting management server 100 (FIG. 1) stores plural pieces of personal identification information as personal identification information IF3. In personal identification information IF3, in the horizontal direction (row direction) of the table, the items "user ID," "user name," and "password" are associated with each other for each user. In the vertical direction (column direction) of the table, the numbers assigned to user IDs are arranged from top down in increasing order.

The personal identification information in FIG. 7 indicates that, for example, a user ID "0001" is assigned to a person having a user name "A," and a password corresponding to the user ID is "1a12c." The user ID and the password can be set freely by each user, for example, using MFP.

The personal identification information is created, for example, by the administrator of the material output system entering each item at the time of initial settings of the material output system (or before the start of the meeting) and is saved as personal identification information IF3 in HDD 101. Personal identification information IF3 may be changed every time a user is changed or added.

[Flow of Material Output]

A flow of outputting a material for a prospective participant in a meeting will now be described.

Figure 8:
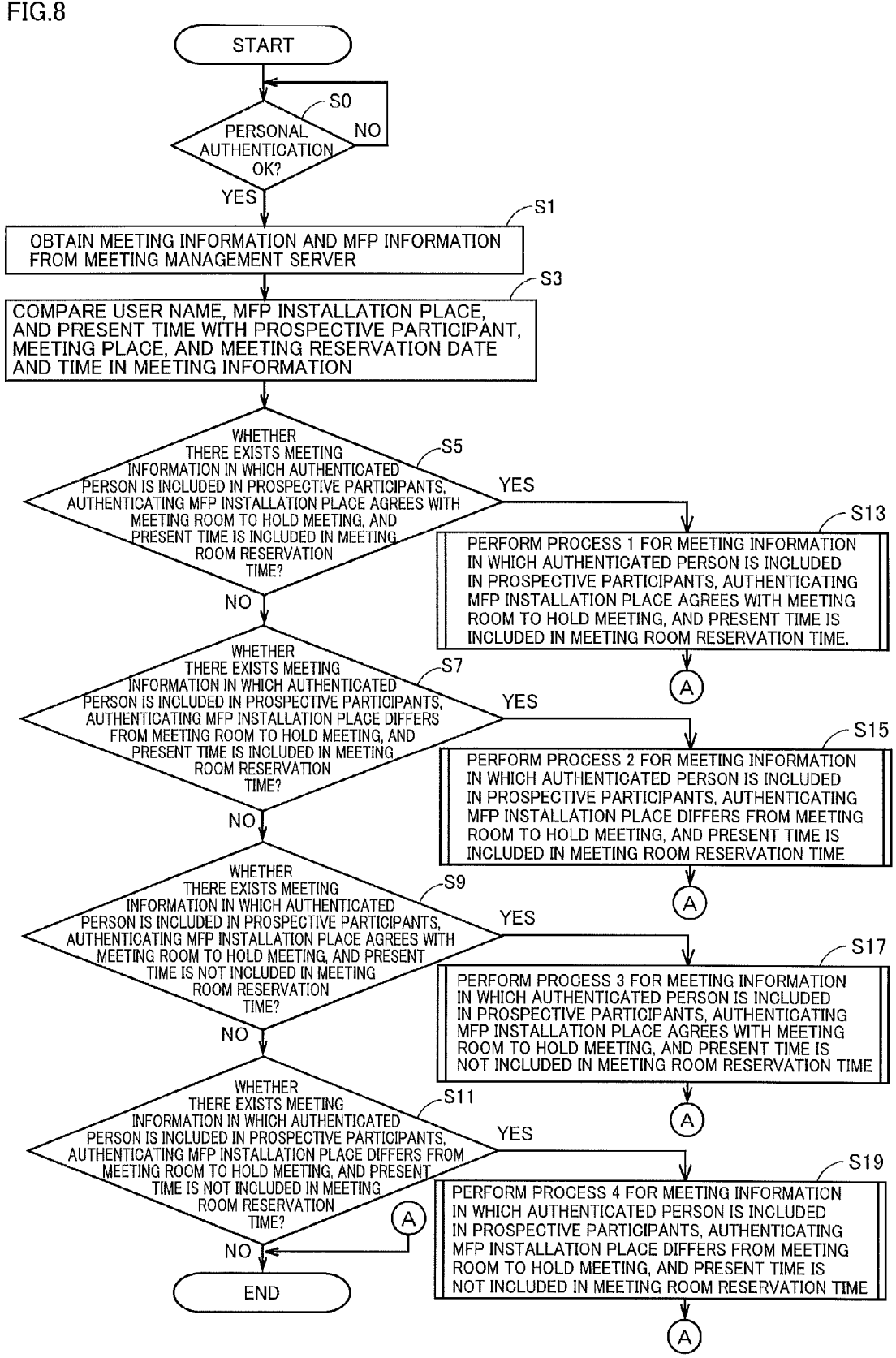
FIG. 8 is a flowchart showing a main routine of a material output process in an embodiment of the present invention, which is performed by CPU of MFP.

FIG. 8 is a flowchart showing a main routine of a material output process in an embodiment of the invention, which is performed by CPU of MFP. It is noted that the process in accordance with the flowchart shown in FIG. 8 may be executed by CPU 102 of meeting management server 100 or CPU 132 of PC 130 (FIG. 1).

Referring to FIG. 8, a user sets his ID card 120 into any given card authentication device 20 (for example, card authentication device 20a). If card authentication device 20 detects ID card 120, CPU 11 of MFP 110 corresponding to that card authentication device 20 (MFP 110a corresponding to card authentication device 20a) obtains personal identification information IF3 from the meeting management server via network 140. CPU 11 then performs personal authentication, depending on whether the user name can be identified in personal identification information IF3, based on the user ID stored in storage unit 121 of ID card 120 (S0).

As for a user authentication method, for example, an ID card may be accepted from card authentication device 20 as described above, or alternatively, the attachment of a storage medium (for example, USB memory) having a personal authentication function may be accepted from USB memory controller 21, or the entry of user ID and password may be accepted from operation panel 16 of MFP 110.

If the user is authenticated (YES in S0), CPU 11 obtains meeting information IF1 and MFP information IF2 from the meeting management server via network 140 (S1) and specifies the installation place of the MFP that has performed authentication (the meeting room corresponding to MFP that has performed authentication), based on MFP information IF2. CPU 11 then compares the user name, the installation place of the MFP that has performed authentication, and the present time (present date and time), with the prospective participants, the meeting place, and the meeting reservation date and time, respectively, in meeting information IF1 (S3).

As for the present time, CPU 11 may obtain the present time from timer unit 22 of MFP 110 or may obtain the present time from network 140. Alternatively, the time at which the user performs authentication may be regarded as the present time.

Then, CPU 11 determines whether meeting information IF1 includes meeting information of a meeting in which the authenticated user (person) is included in the prospective participants, in which the installation place of the MFP that has performed authentication agrees with the meeting room where the meeting is held, and in which the present time is included in the meeting room reservation time (whether such meeting information is stored in HDD 101 of meeting management server 100) (S5).

If meeting information IF includes meeting information of a meeting in which the authenticated user is included in the prospective participants, in which the installation place of the MFP that has performed authentication agrees with the meeting room where the meeting is held, and in which the present time is included in the meeting room reservation time (YES in S5), it is indicated that the authenticated user is about to attend the meeting and is present in the meeting room where the meeting is held. In this case, CPU 11 performs a process 1 as described later for the corresponding information, thereby to instruct MFP 110 to output a material saved in the location associated with the meeting information (S13). The process then ends.

If meeting information IF1 does not include meeting information of a meeting in which the authenticated user is included in the prospective participants, in which the installation place of the MFP that has performed authentication agrees with the meeting room where the meeting is held, and in which the present time is included in the meeting room reservation time (NO in S5), CPU 11 determines whether meeting information IF1 includes meeting information of a meeting in which the authenticated user is included in the prospective participants, in which the installation place of the MFP that has performed authentication differs from the meeting room where the meeting is held, and in which the present time is included in the meeting room reservation time (S7).

If meeting information IF1 includes meeting information of a meeting in which the authenticated user is included in the prospective participants, in which the installation place of the MFP that has performed authentication differs from the meeting room where the meeting is held, and in which the present time is included in the meeting room reservation time (YES in S7), it is indicated that the authenticated user is about to attend the meeting but is not present in the meeting room where the meeting is held. In this case, CPU 11 performs a process 2 as described later for the corresponding meeting information, thereby to display on liquid crystal display 31 a screen that allows output of a material saved in the location associated with the meeting information, and to instruct the selected MFP 110 to output the material (S15). The process then ends.

If meeting information IF1 does not include meeting information of a meeting in which the authenticated user is included in the prospective participants, in which the installation place of the MFP that has performed authentication differs from the meeting room where the meeting is held, and in which the present time is included in the meeting room reservation time (NO in S7), CPU 11 determines whether meeting information IF1 includes meeting information of a meeting in which the authenticated user is included in the prospective participants, in which the installation place of the MFP that has performed authentication agrees with the meeting room where the meeting is held, and in which the present time is not included in the meeting room reservation time (S9).

If meeting information IF1 includes meeting information of a meeting in which the authenticated user is included in the prospective participants, in which the installation place of the MFP that has performed authentication agrees with the meeting room where the meeting is held, and in which the present time is not included in the meeting room reservation time (YES in S9), it is indicated that the authenticated user is not about to attend a meeting right now but is scheduled to attend a meeting in the future in the meeting room where the user is present. In this case, CPU 11 performs a process 3 as described later for the corresponding meeting information, thereby to display on liquid crystal display 31 a screen to allow output of a material saved in the location associated with the meeting information, and to instruct MFP 110 to output the selected meeting material (S17). The process then ends.

If meeting information IF1 does not include meeting information of a meeting in which the authenticated user is included in the prospective participants, in which the installation place of the MFP that has performed authentication agrees with the meeting room where the meeting is held, and in which the present time is not included in the meeting room reservation time (NO in S9), CPU 11 determines whether meeting information IF1 includes meeting information of a meeting in which the authenticated user is included in the prospective participants, in which the installation place of the MFP that has performed differs from the meeting room where the meeting is held, and in which the present time is not included in the meeting room reservation time (S11).

If meeting information IF1 includes meeting information of a meeting in which the authenticated user is included in the prospective participants, in which the installation place of the MFP that has performed authentication differs from the meeting room where the meeting is held, and in which the present time is not included in the meeting room reservation time (YES in S11), it is indicated that the authenticated user is not about to attend a meeting right now, and a meeting the user is scheduled to attend in the future is not held in the meeting room where the user is present, and it is only indicated that the user has a meeting to attend in the future. In this case, CPU 11 performs a process 4 described later for the corresponding meeting information, thereby to display on liquid crystal display 31 a screen that allows output of a material saved in the location associated with that meeting information, and to instruct MFP 110 to output the selected meeting material (S19). The process then ends.

If meeting information IF1 does not include meeting information of a meeting in which the authenticated user is included in the prospective participants, in which the installation place of the MFP that has performed authentication differs from the meeting room where the meeting is held, and in which the present time is not included in the meeting room reservation time (NO in S11), it is indicated that there exists no meeting the authenticated user is scheduled to attend. In this case, the process ends.

In this manner, the material output system in the present embodiment performs the processing in the case where the user outputs a meeting material on his own and when the user performs personal authentication with MFP using a USB memory or an authentication card. In the material output system in the present embodiment, the processing varies among the meetings the user is scheduled to attend, depending on whether the installation place of the MFP that has authenticated and the present time agree with the meeting place and time, respectively, included in the meeting information stored in the meeting management server.

Figure 9:
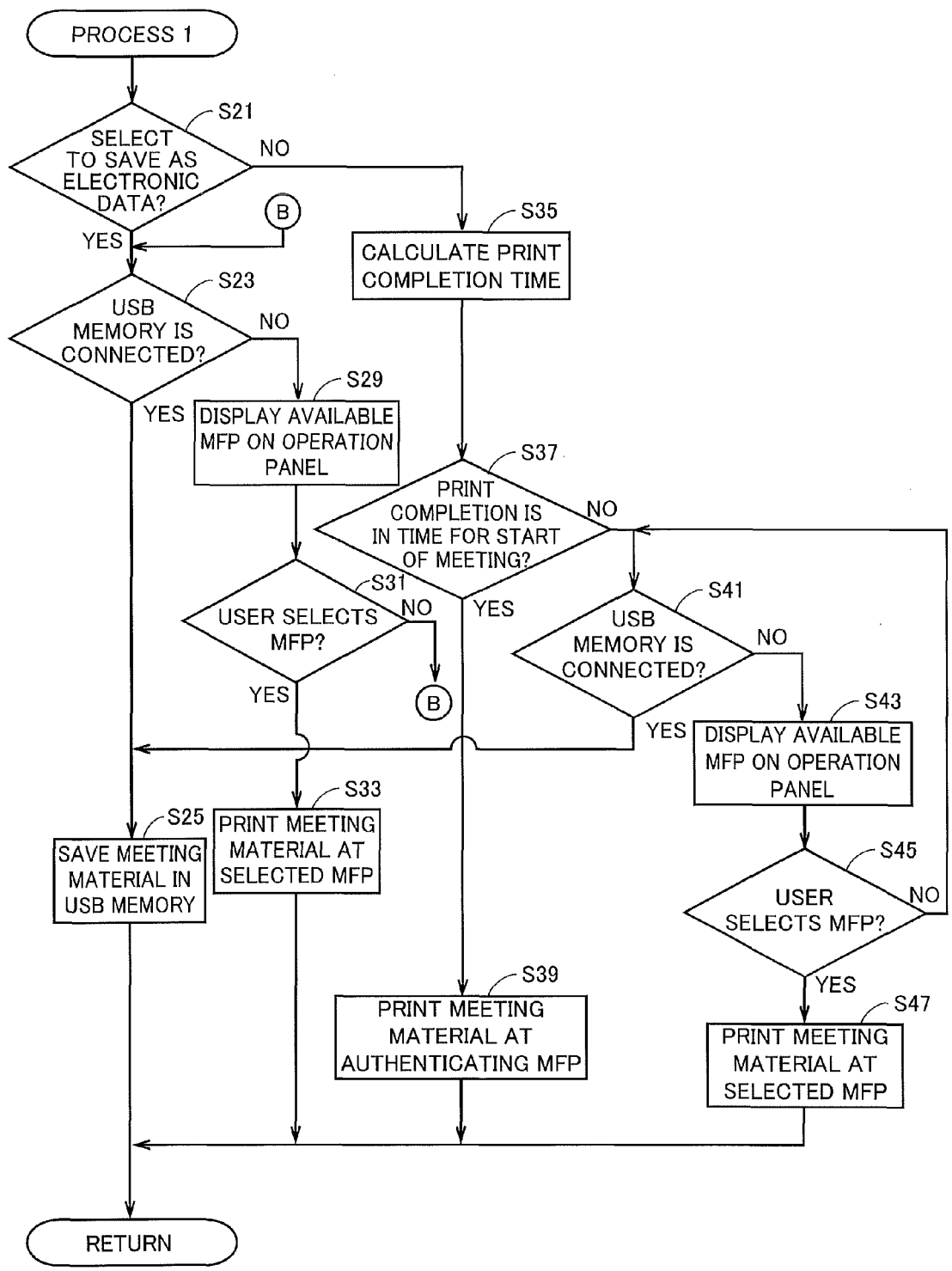
FIG. 9 is a flowchart showing a subroutine of a process 1 in FIG. 8 in detail.

FIG. 9 is a flowchart showing a subroutine of the process 1 in FIG. 8 in detail. The process 1 shown in FIG. 9 is the process of instructing MFP to output a material used in a meeting, for a meeting (also referred to as a first type of meeting) in which the authenticated user is included in the prospective participants, the installation place of the MFP 110 that has performed authentication agrees with the meeting room where the meeting is held, and the present time is included in the meeting room reservation time.

Referring to FIG. 9, in the process 1, for the meeting information of the first type of meeting, CPU 11 refers to the "paper/electronic data" field (FIG. 5) in the meeting information. CPU 11 then determines whether the authenticated user selects to save (output) the meeting material of the meeting in the form of an electronic file (electronic data) (S21). In step S21, instead of the manner as described above, it may be determined whether the user selects to output in the form of an electronic file, for example, by displaying a button "Save in USB memory" and a button "Paper Output" on liquid crystal display 31 of operation panel 16 and asking the user to press one of the buttons.

If the user selects to save in the form of an electronic file in step S21 (YES in S21), CPU 11 determines whether a USB memory is connected to MFP 110 that has performed authentication (S23). If a USB memory is connected (YES in S23), CPU 11 obtains data of the meeting material via network 140 from the location designated in the "meeting material save location" field in the meeting information of the first type of meeting and then saves the obtained data into the USB memory (S25). The process then ends.

If a USB memory is not connected in step S23 (NO in S23), the material cannot be output as an electronic file from the MFP 110 that has performed authentication. In this case, in order to output the meeting material in the form of a paper printout, CPU 11 displays available MFP 110 on liquid crystal display 31 of operation panel 16 and allows the user to select an MFP for printing the material (S29). It is noted that available MFP 110 refers to an MFP installed in the place designated in the "printing available place" corresponding to the "MFP installation place" of the MFP 110 that has performed authentication, in MFP information IF2 (FIG. 6).

If MFP 110 for printing a material is selected by the user within a certain period of time after available MFP 110 is displayed (YES in S31), CPU 11 obtains data of the meeting material via network 140 from the location designated in the "meeting material save location" field in the meeting information of the first type of meeting, and instructs the MFP 110 selected by the user to print the meeting material (S33). The process then ends. In step S31, if MFP 110 is not selected by the user within a certain period of time (NO in S31), the process returns to step S23 to determine whether a USB memory is connected to the MFP 110 that has performed authentication. Accordingly, if a USB memory or the like is connected before MFP 110 for printing is selected, the material is saved in the USB memory as electronic data.

If the user selects to output the meeting material in the form of a paper printout in step S21 (NO in S21), CPU 11 calculates the time taken to complete printing (print completion time) when the meeting material is printed by the MFP 110 that has performed authentication (S35). As for the print completion time for the MFP 110 that has performed authentication, the calculated print completion time is prolonged (delayed), if the MFP 110 that has performed authentication has been executing another job (for example, printing the meeting material for another meeting participant) before printing the meeting material for the authenticated user, or if one meeting material has a large volume.

CPU 11 then refers to the "meeting date and time" field (FIG. 5) in the meeting information for the first type of meeting and compares the meeting start time with the calculated print completion time to determine whether the printing of the meeting material by the MFP 110 that has performed authentication will be completed in time for the start of the meeting (step S37). If the print completion time is earlier than the meeting start time (YES in step S37), the printing of the meeting material by the MFP 110 that has performed authentication will be completed in time for the start of the meeting, and therefore, the meeting material is printed automatically only with the authentication. In this case, CPU 11 obtains data of the meeting material via network 140 from the location designated in the "meeting material save location" in the meeting information of the first type of meeting and instructs the MFP 110 that has performed authentication to print the meeting material (S39). The process then ends.

If the print completion time is later than the meeting start time in step S37 (NO in step S37), many jobs are accumulated in the MFP 110 that has performed authentication, at the time when the user is authenticated, and the printing of the meeting material by the MFP 110 that has performed authentication will not be completed in time for the start of the meeting. In such a case, in order that the authenticated user can obtain the meeting material before the start of the meeting, it is desired that the meeting material shall be output in a manner other than printing by the MFP 110 that has performed authentication. In this case, CPU 11 determines whether a USB memory is connected to MFP 110 that has performed authentication (S41). If a USB memory is connected (YES in S41), CPU 11 performs the process in step S25. In this manner, if a USB memory is connected before MFP 110 for printing is selected, CPU 11 automatically changes the process to save electronic data into a USB memory or the like. The process then ends.

If a USB memory is not connected in step S41 (NO in S41), the material cannot be output as an electronic file from the MFP 110 that has performed authentication. In this case, in order to output the meeting material in the form of a paper printout, CPU 11 displays available MFP 110 on liquid crystal display 31 of operation panel 16 and allows the user to select an MFP for printing the material (S43). If MFP 110 for printing the material is selected by the user within a certain period of time after available MFP 110 is displayed (YES in S45), CPU 11 obtains data of the meeting material via network 140 from the location designated in the "meeting material save location" field of the meeting information of the first type of meeting, and instructs the MFP 110 selected by the user to print the meeting material (S47). The process then ends.

If MFP 110 is not selected by the user within a certain period of time in step S45 (NO in S45), the process returns to step S41, and CPU 11 determines again whether a USB memory is connected to the MFP 110 that has performed authentication.

As described above, the process 1 is a process performed in the case where there exists a meeting which the user is scheduled to attend, of which meeting place included in the meeting information agrees with the installation place of the MFP that has performed authentication, and of which meeting time (reservation time) includes the present time. In this process, without allowing the user to select, from the meeting information list, the meeting for which material should be output (without requiring any other operation), the material used in the meeting is automatically output (printed) by the MFP that has performed authentication.

Figure 10:
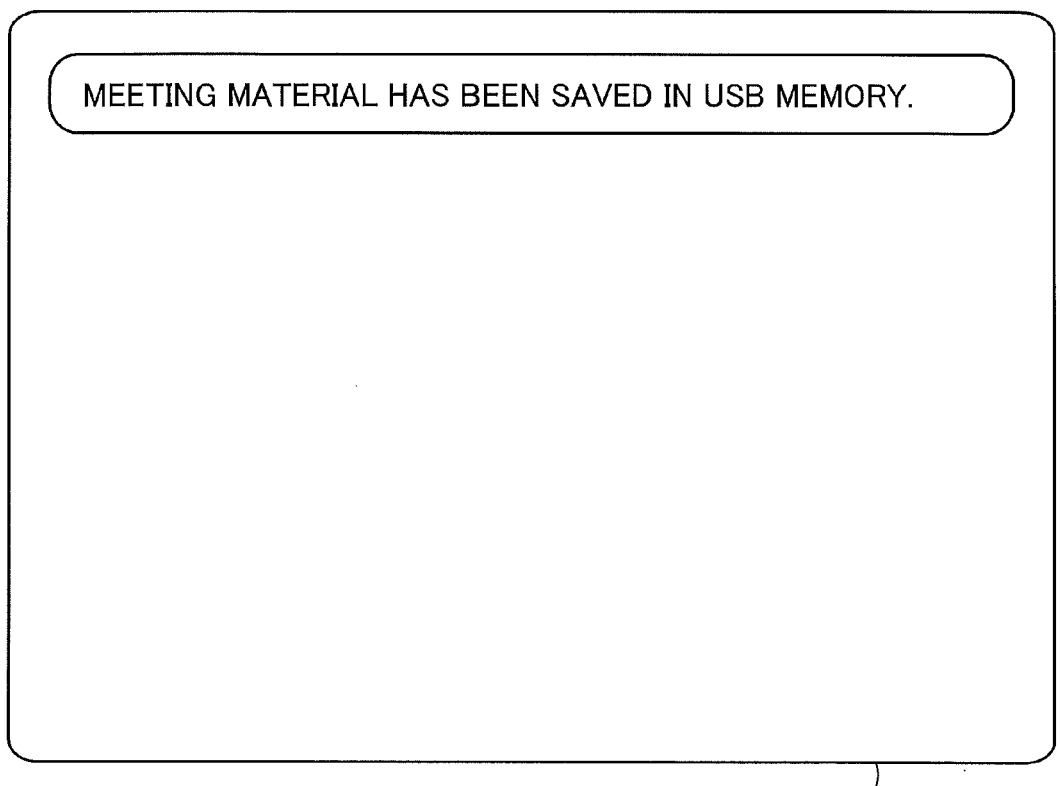
FIG. 10 shows an example of a screen appearing on a liquid crystal display of an operation panel in step S25 in FIG. 9.

FIG. 10 shows an example of a screen appearing on the liquid crystal display of the operation panel in step S25 in FIG. 9.

Referring to FIG. 10, when the saving of data of the meeting material into a USB memory has been completed, liquid crystal display 31 of operation panel 16 displays a message "Meeting material has been saved in USB memory" to notify the user of completion of saving of the meeting material.

Figure 11:
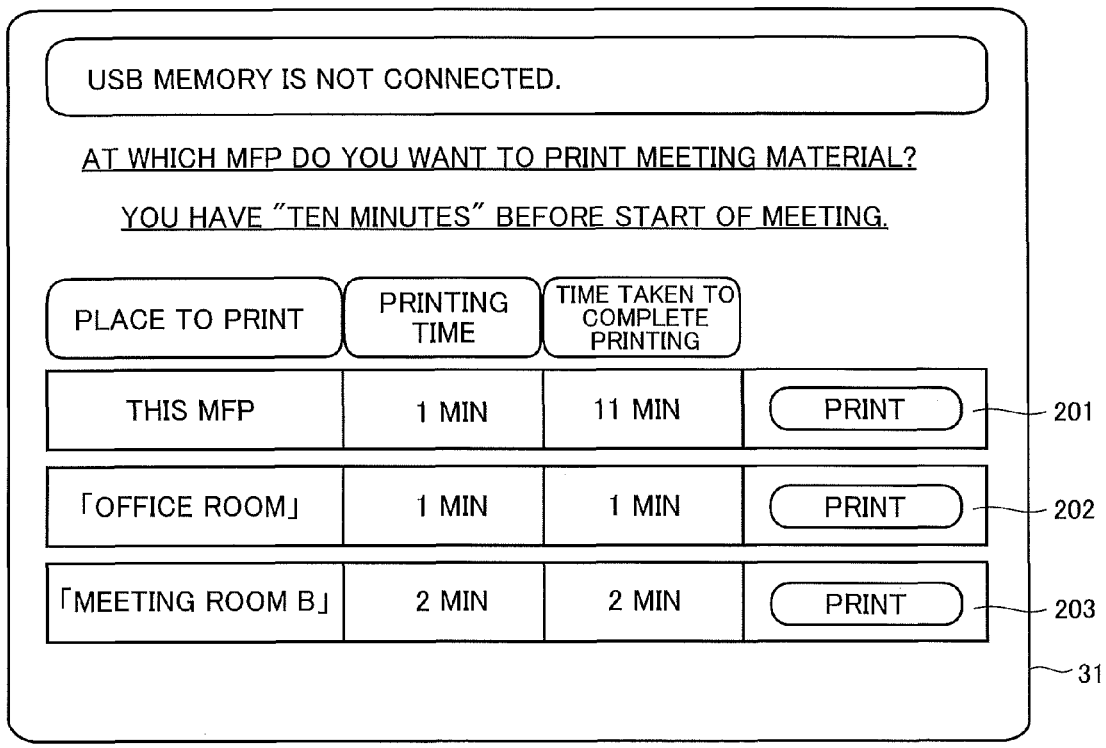
FIG. 11 shows an example of a screen appearing on the liquid crystal display of the operation panel in step S29 in FIG. 9.
Figure 12:
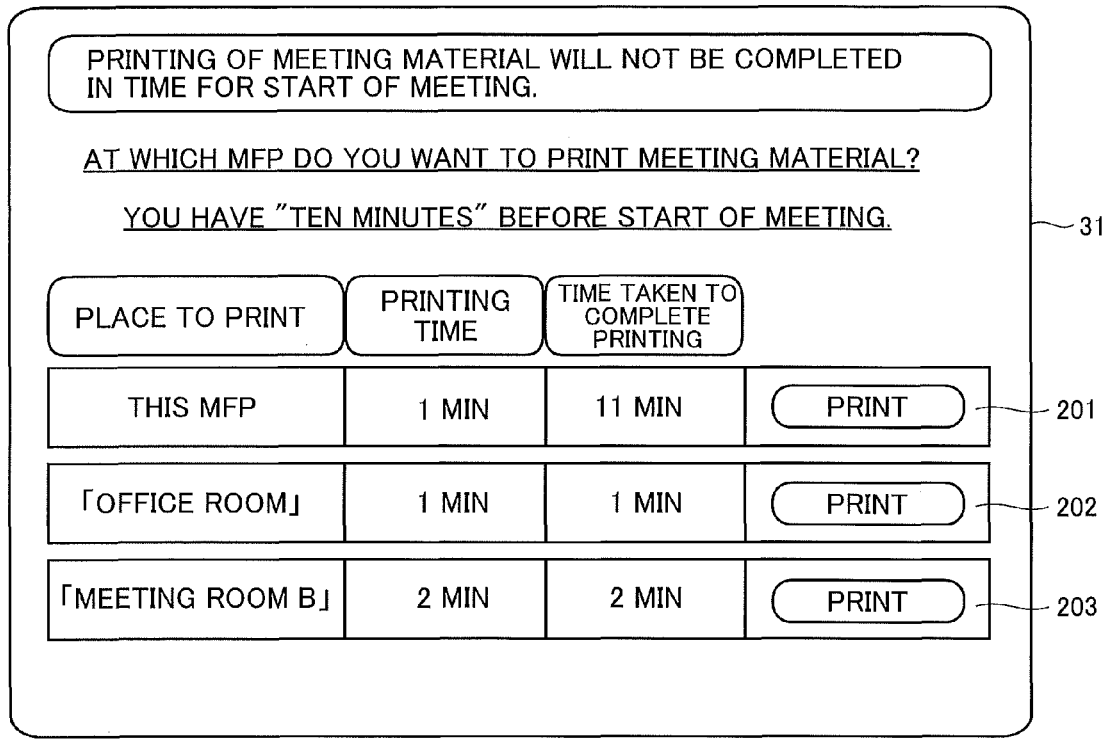
FIG. 12 shows an example of a screen appearing on the liquid crystal display of the operation panel in step S43 in FIG. 9.

FIG. 11 shows an example of a screen appearing on the liquid crystal display of the operation panel in step S29 in FIG. 9. FIG. 11 and FIG. 12 show examples of the screens in the case where authentication is performed by MFP 110a (FIG. 1) installed in meeting room A at Osaka branch where the meeting the user is about to attend is held.

Referring to FIG. 11, in step S29 in FIG. 9, a message "USB memory is not connected" appears on liquid crystal display 31 of operation panel 16 to indicate that the output as an electronic file is impossible. Along with this message, a screen appears to select an MFP for printing the meeting material from among "this MFP" (MFP 110a), "office room" (MFP 110c), and "meeting room B" (MFP 110b). MFP 110a, 110c, and 110b are associated with PRINT buttons 201, 202, and 203, respectively, for executing printing. When the user presses one of PRINT buttons 201 to 203, the meeting material is printed by the MFP corresponding to the pressed PRINT button.

FIG. 12 shows an example of a screen appearing on the liquid crystal display of the operation panel in step S43 in FIG. 9.

Referring to FIG. 12, in step S43 in FIG. 9, a message "Printing of the meeting material will not be completed in time for the start of the meeting" appears on liquid crystal display 31 of operation panel 16 to indicated that printing will not be completed in time for the start of the meeting. Along with this message, a screen appears to select an MFP for printing the meeting material from among "this MFP" (MFP 110a), "office room" (MFP 110c), and "meeting room B" (MFP 110b), which are MFPs available for printing. MFPs 110a, 110c, and 110b are associated with PRINT buttons 201, 202, and 203, respectively, for executing printing. When the user presses one of PRINT buttons 201 to 203, the meeting material is printed by the MFP corresponding to the pressed PRINT button.

FIG. 13 is a flowchart showing a subroutine of the process 2 in FIG. 8 in detail. The process 2 shown in FIG. 13 is a process of displaying a screen to allow output of a material used in a meeting and instructing an MFP selected by the user to output the material, for the meeting (also referred to as a second type of meeting) in which the authenticated user is included in the prospective participants, in which the installation place of the MFP 110 that has performed authentication differs from the meeting room where the meeting is held, and in which the present time is included in the meeting room reservation time.

Referring to FIG. 13, in the process 2, CPU 11 refers to the "paper/electronic data" field (FIG. 5) of the meeting information for the second type of meeting. CPU 11 then determines whether the authenticated user selects to output (save) in the form of an electronic file (electronic data) for the meeting material of the second type of meeting (S51). It is noted that in step S51, instead of the above-noted manner, it may be determined whether the user selects to output in the form of an electronic file by displaying a button "Save in USB Memory" and a button "Paper Output" on liquid crystal display 31 of operation panel 16 and asking the user to press one of the buttons.

If the user selects to save in the form an electronic file in step S51 (YES in S51), CPU 11 determines whether a USB memory is connected to the MFP 110 that has performed authentication (S53). If a USB memory is connected (YES in S53), CPU 11 obtains data of the meeting material via network 140 from the location designated in the "meeting material save location" in the meeting information of the second type of meeting, and saves the obtained data in the USB memory (S55). The process then ends.

If a USB memory is not connected in step S53 (NO in S53), it is impossible to output the material as an electronic file from the MFP 110 that has performed authentication. In this case, in order to output the meeting material in the form of a paper printout, CPU 11 displays available MFP 110 on liquid crystal display 31 of operation panel 16 and allows the user to select an MFP for printing the material (S57). The screen that displays available MFP 110 may include a message to indicate that the place where the meeting is held differs from the current place and to indicate the place where the meeting is held. If MFP 110 for printing the material is selected by the user within a certain period of time after available MFP 110 is displayed (YES in S59), CPU 11 obtains data of the meeting material via network 140 from the location designated in the "meeting material save location" field in the meeting information of the second type of meeting, and instructs the MFP 110 selected by the user to print the meeting material (S61). The process then ends.

If MFP for printing the material is not selected by the user within a certain period of time in step S59 (NO in S59), the process returns to step S53, and CPU 11 determines again whether a USB memory is connected to the MFP 110 that has performed authentication. Accordingly, if a USB memory or the like is connected to MFP 110 before MFP 110 is selected, the meeting material can be saved in the USB memory.

If the user selects to output the meeting material in the form of a paper printout in step S51 (NO in S51), CPU 11 determines whether a USB memory is connected to the MFP 110 that has performed authentication (S63). When a USB memory is connected (YES in S63), the output may be completed earlier by saving the material data in a USB memory than by printing the material on paper. Therefore, in such a case, CPU 11 displays on liquid crystal display 31 of operation panel 16 a screen to select to output the meeting material as an electronic file (save in a USB memory) or printout, and allows the user to select a material output form (S65). If there exist a plurality of MFPs available for printing, a screen appears to select an MFP for printing from among a plurality of MFPs. The screen that allows the user to select a material output form may include a message to indicate that the place where the meeting is held differs from the current place and to indicate the place where the meeting is held. If to save the meeting material in a USB memory is selected by the user within a certain period of time after the screen that allows the user to select a material output form is displayed (YES in S67), CPU 11 performs the process in step S55 and ends the process.

If to save the meeting material in a USB memory is not selected by the user within a certain period of time in step S67 (NO in S67), CPU 11 proceeds to step S71 as described later.

If a USB memory is not connected in step S63 (NO in S63), it is impossible to output the material as an electronic file from the MFP 110 that has performed authentication. In this case, in order to output the meeting material in the form of a paper printout, CPU 11 displays available MFP 110 on liquid crystal display 31 of operation panel 16 for a certain period of time and allows the user to select an MFP for printing the material (S69). The screen that displays available MFP 110 may include a message to indicate the place where the meeting is held. CPU 11 then determines whether MFP 110 for printing the material is selected by the user within the certain period of time (S71). If MFP 110 for printing the material is not selected (NO in S71), CPU 11 returns to step S63 and determines again whether a USB memory is connected to the MFP 110 that has performed authentication. Accordingly, if a USB memory or the like is connected to MFP 110 before MFP 110 is selected, an option to save the meeting material in a USB memory may also be displayed in step S65. If MFP 110 for printing the material is selected in step S71 (YES in S71), CPU 11 performs the process in step S61 and ends the process.

As described above, the process 2 is a process performed in the case where there exists a meeting which the user is scheduled to attend, of which meeting place included in the meeting information differs from the installation place of the MFP that has performed authentication, and of which meeting time (reservation time) includes the present time (if there is a match for meeting time but there is no match for meeting place in the meeting information). In this process, the place where the meeting is held as well as MFP available for printing is displayed on the operation panel, and the material used in the meeting is output (printed) by the MFP selected by the user.

FIG. 14 shows an example of a screen appearing on the liquid crystal display of the operation panel in step S57 or step S69 in FIG. 13. It is noted that FIG. 14 and FIG. 15 show examples of the screens in the case where authentication is performed by MFP 110c (FIG. 1) installed in the office room and the meeting the user is about to attend is held in meeting room A at Osaka branch.

Referring to FIG. 14, in step S57 or step S69 in FIG. 13, liquid crystal display 31 of operation panel 16 displays a message "You are in a different meeting room. The meeting will be held in meeting room A." to indicate that the place where the meeting is held is different from the current place and to indicate the place where the meeting the user is about to attend is held. Along with this message, a screen also appears to select an MFP for printing the meeting material from among "this MFP" (MFP 110c), "meeting room A" (MFP 110a), and "meeting room B" (MFP 110b), as MFPs available for printing. MFPs 110c, 110a, and 110b are associated with PRINT buttons 201, 202, 203, respectively, for executing printing. When the user selects one of PRINT buttons 201 to 203, the meeting material is printed by the MFP corresponding to the pressed PRINT button.

FIG. 15 shows an example of a screen appearing on the liquid crystal display of the operation panel in step S65 in FIG. 13.

Referring to FIG. 15, in step S65 in FIG. 13, in addition to the message and the choices of MFPs for printing the meeting material, similar to those of FIG. 14, an option "Save electronic data in USB memory" is also displayed. The option "Save electronic data in USB memory" is associated with a GO button 204. More specifically, the displayed screen allows the user to select an output form of the meeting material from among four options: to print from "this MFP" (MFP 110a), to print from the MFP in "office room" (MFP 110c), to print from the MFP in "meeting room B" (MFP 110b), and to save as electronic data in a USB memory. When the user presses one of buttons 201 to 204, the meeting material is output in the output form corresponding to the pressed button.

It is noted that, as shown in FIG. 11, FIG. 12, FIG. 14, and FIG. 15, when the screen to select an MFP for printing the meeting material is displayed, the remaining time before the start of the meeting and the predicted time taken to complete printing in each available MFP may be additionally displayed. For example, in FIG. 11, FIG. 12, FIG. 14, and FIG. 15, a message "You have 10 MINUTES before the start of the meeting." is displayed to indicate the remaining time before the start of the meeting. In addition, the predicted time taken to print the meeting material for the user in each MFP is displayed (one minute for the MFP in meeting room A, one minute for the MFP in the office room, two minutes for the MFP in meeting room B). In addition, the predicted time from the present time to the completion of printing of the meeting material for the user is also displayed (11 minutes for the MFP in meeting room A, one minute for the MFP in the office room, and two minutes for the MFP in meeting room B).

Figure 16:
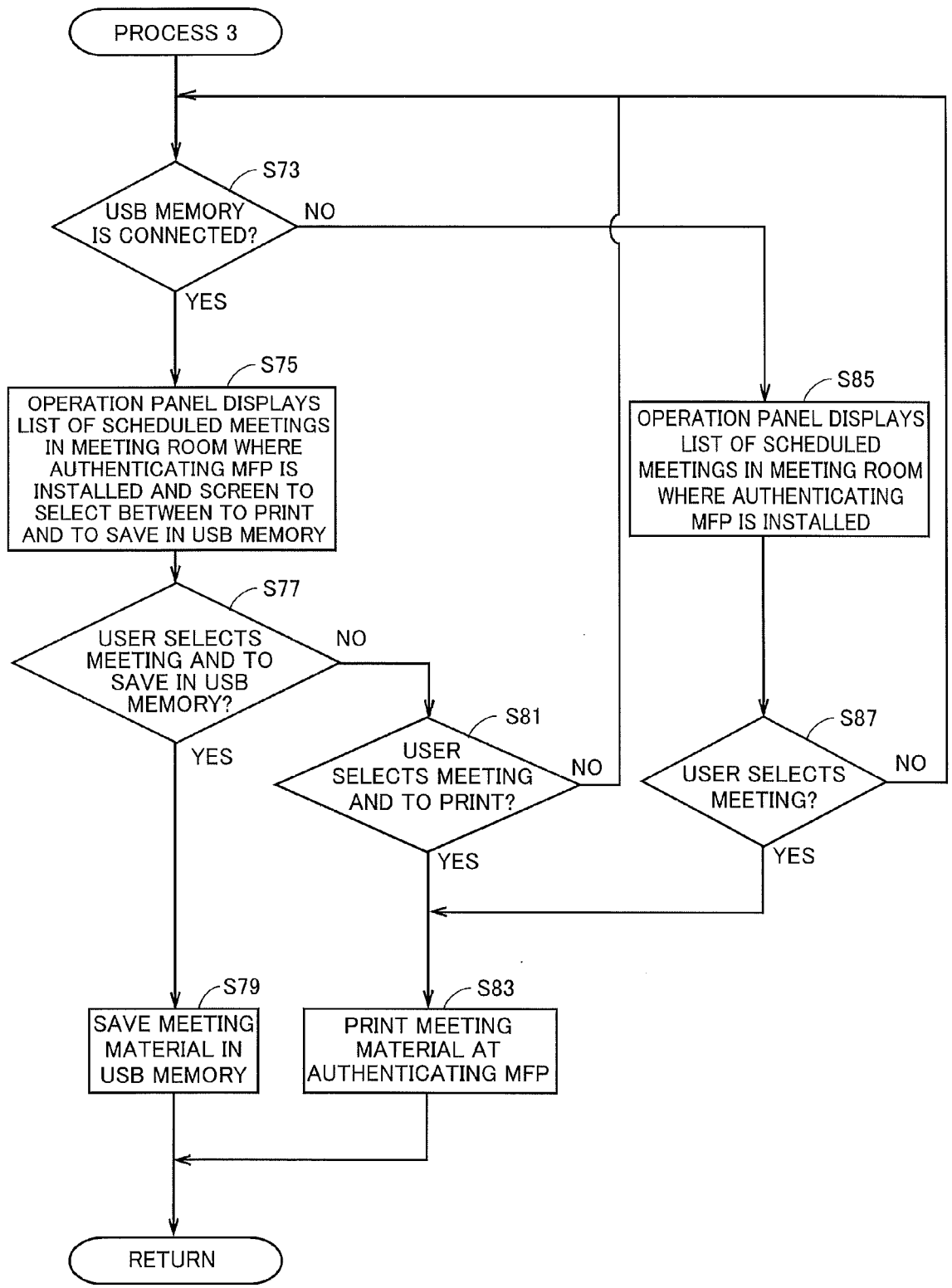
FIG. 16 is a flowchart showing a subroutine of a process 3 in FIG. 8 in detail.

FIG. 16 is a flowchart showing a subroutine of the process 3 in FIG. 8 in detail. The process 3 shown in FIG. 16 is performed for the meeting (hereinafter also referred to as a third type of meeting) in which the authenticated user is included in the prospective participants, in which the installation place of the MFP 110 that has performed authentication agrees with the meeting room where the meeting is held, and in which the present time is not included in the meeting room reservation time. The process 3 is to display a screen that allows output of the material used in the third type of meeting and to instruct MFP to output the meeting material selected by the user.

Referring to FIG. 16, in the process 3, CPU 11 determines whether a USB memory is connected to the MFP 110 that has performed authentication (S73). If a USB memory is connected (YES in S73), CPU 11 displays, on liquid crystal display 31 of operation panel 16, a list of the scheduled meetings (the third type of meetings) in the meeting room where the MFP 110 that has performed authentication is installed, and displays a screen to select output of the material used in the meeting from the list of scheduled meetings for a certain period of time. At the same time, CPU 11 displays a screen to select between to print and to save in USB memory (a screen to select to print the meeting material or to output as an electronic file (save in a USB memory)) (S75). CPU 11 then determines whether a specific meeting is selected by the user from among the third type of meetings within the above-noted certain period of time, and whether to save the material used in that meeting in a USB memory is selected by the user (S77). If a specific meeting is selected from among the third type of meetings within the above-noted certain period of time and if to save the material used in that meeting in a USB memory is selected by the user (YES in S77), CPU 11 obtains data of the meeting material via network 140 from the location designated in the "meeting material save location" of the meeting information of the selected meeting and saves the obtained data in a USB memory (S79). The process then ends.

If a specific meeting is not selected from among the third type of meetings within the above-noted certain period of time or if to save in a USB memory is not selected in step S77 (NO in S77), it is determined whether a specific meeting is selected by the user from among the third type of meetings within the above-noted certain period of time, and whether to print the material used in that meeting is selected by the user (S81). If a specific meeting is selected from among the third type of meetings by the user within the above-noted certain period of time and if to print the material used in that meeting is selected by the user (YES in S81), CPU 11 obtains data of the meeting material via network 140 from the location designated in the "meeting material save location" of the meeting information of the selected meeting and instructs the MFP 110 that has performed authentication to print the meeting material (S83). The process then ends. If a specific meeting is not selected by the user from among the third type of meetings within the above-noted certain period of time or if to print the material is not selected by the user in step S81 (NO in S81), CPU 11 returns to step S73 and determines again whether a USB memory is connected to the MFP 110 that has performed authentication.

If a USB memory is not connected to MFP 110 that has performed authentication in step S73 (NO in S73), CPU 11 displays, on liquid crystal display 31 of operation panel 16, a list of the scheduled meetings (the third type of meetings) in the meeting room where the MFP 110 that has performed authentication is installed, for a certain period of time (S85). CPU 11 then determines whether a specific meeting is selected by the user from among the third type of meetings within the above-noted certain period of time (S87). If a specific meeting is selected from among the third type of meetings within the above-noted certain period of time (YES in S87), CPU 11 obtains data of the meeting material via network 140 from the location designated in the "meeting material save location" of the meeting information of the selected meeting and instructs the MFP 110 that has performed authentication to print the meeting material (S83). The process then ends. If a specific meeting is not selected by the user from among the third type of meetings within the above-noted certain period of time (NO in S87), CPU 11 returns to step S73 and determines again whether a USB memory is connected to the MFP 110 that has performed authentication.

As described above, the process 3 is a process performed in the case where there exists a meeting which the user is scheduled to attend, of which meeting time (reservation time) does not include the present time, and of which meeting place included in the meeting information agrees with the installation place of the MFP that has performed authentication (if there is no match for meeting time but there is a match for meeting place in the meeting information). In this process, a list of scheduled meetings in the matched meeting place is displayed on the operation panel, and if the user selects output for a particular meeting, the material used in that meeting is output (printed) by the MFP that has performed authentication.

FIG. 17 schematically shows a list of future meeting information in which a user "A" is included in the meeting participants.

Referring to FIG. 17, meeting information for eight meetings is arranged in the vertical direction in the figure. In the figure, shown in the horizontal direction are a meeting name, a meeting place, a meeting room reservation date and time, and a meeting material save location, for each meeting. The information in FIG. 17 is extracted from meeting information IF1.

Here, it is assumed that the user performs authentication with MFP 110a installed in meeting room A at Osaka branch at a time (for example, at 12:00 on Mar. 1, 2009) that is not included in the meeting room reservation date and time of any of the meetings. In this case, "xxx progress meeting," "yyy monthly report" and "zzz meeting," which are meetings to be held in meeting room A at Osaka branch, are extracted from the meeting information shown in FIG. 17, and the meeting information of these three meetings is partially displayed on liquid crystal display 31 of operation panel 16.

Figure 18:
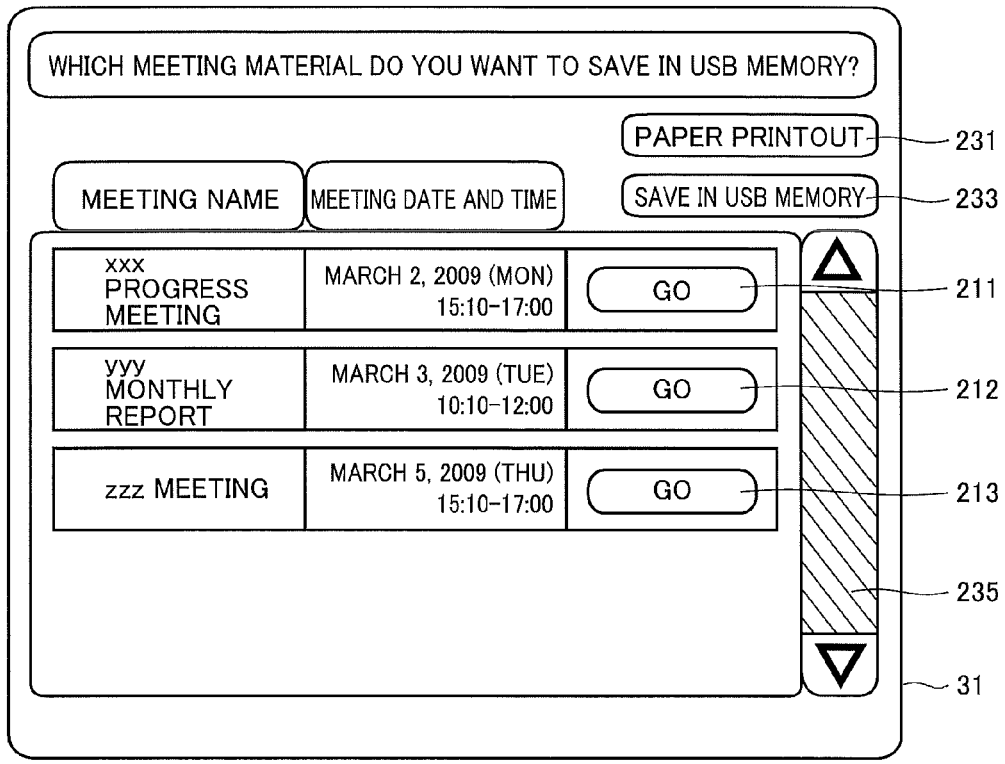
FIG. 18 shows an example of a screen appearing on the liquid crystal display of the operation panel in step S75 in FIG. 16.
Figure 19:
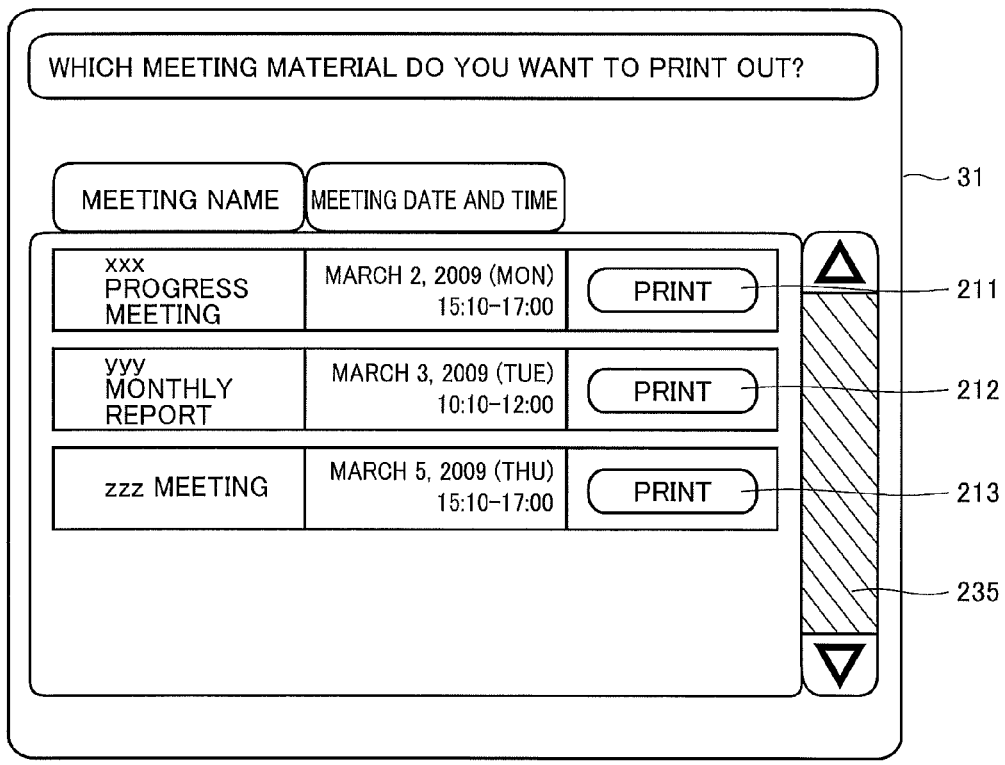
FIG. 19 shows an example of a screen appearing on the liquid crystal display of the operation panel in step S85 in FIG. 16.

FIG. 18 shows an example of a screen appearing on the liquid crystal display of the operation panel in step S75 in FIG. 16. FIG. 18 and FIG. 19 show the screens appearing when the user "A" performs authentication with MFP 110a in meeting room A at Osaka branch.

Referring to FIG. 18, in step S75 in FIG. 16, liquid crystal display 31 of operation panel 16 displays a message "Which meeting material do you want to save in USB memory?" to allow the user to select a meeting material to be output. Along with this message, the meeting name and the meeting date and time are displayed for each of the meetings "xxx progress meeting," "yyy monthly report," and "zzz meeting." The meeting names are associated with "GO" buttons 211-213 for executing output of the materials to be used in the meetings. If there are so many meetings to be displayed that cannot be included in a single screen, the display region may be scrolled using a scroll bar 235 (in FIG. 18, the three meetings to be displayed can be included in a single screen and therefore scroll bar 235 is not available).

Liquid crystal display 31 of operation panel 16 further displays a "Paper Printout" output form button 231 for selecting to print out the meeting material and a "Save in USB memory" output form button 233 for selecting to save the meeting material into USB memory.

In the state in which the screen in FIG. 18 is displayed, if any one of GO buttons 211-213 is pressed by the user within a certain period of time, and if output form button 231 or 233 is pressed by the user, the material used in the meeting corresponding to the pressed GO button is output in the output form corresponding to the pressed output form button, at MFP 110a that has performed authentication.

FIG. 19 shows an example of a screen appearing on the liquid crystal display of the operation panel in step S85 in FIG. 16.

Referring to FIG. 19, in step S85 in FIG. 16, a USB memory is not connected to the MFP 110 that has performed authentication, and the meeting material thus cannot be saved in USB. Therefore, liquid crystal display 31 of operation panel 16 displays a message "Which meeting material do you want to print out?" to allow the user to select a meeting material to be printed. Liquid crystal display 31 of operation panel 16 does not display the "Paper Printout" output form button and the "Save in USB memory" output form button in FIG. 18. Except for this, the screen in FIG. 19 is similar to the screen in FIG. 18, and therefore the description thereof will not be repeated.

In the state in which the screen in FIG. 19 is displayed, if any one of PRINT buttons 211-213 is pressed by the user within a certain period of time, the material used in the meeting corresponding to the pressed PRINT button is printed at MFP 110a that has performed authentication.

FIG. 20 is a flowchart showing a subroutine of the process 4 in FIG. 8 in detail. The process 4 shown in FIG. 20 is performed for the meeting (hereinafter also referred to as a fourth type of meeting) in which the authenticated user is included in the prospective participants, in which the installation place of the MFP 110 that has performed authentication differs from the meeting room where the meeting is held, and in which the present time is not included in the meeting room reservation time. The process 4 is to display a screen that allows output of the material used in the fourth type of meeting and to instruct MFP to output the meeting material selected by the user.

Referring to FIG. 20, in the process 4, CPU 11 determines whether a USB memory is connected to the MFP 110 that has performed authentication (S93). If a USB memory is connected (YES in S93), CPU 11 displays, on liquid crystal display 31 of operation panel 16, a list of the scheduled meetings (the fourth type of meetings) in which the user is included in the prospective participants, and displays a screen to select the material used in the meeting from the list of the scheduled meetings for a certain period of time. At the same time, CPU 11 displays a screen to select between to print and to save in USB memory (a screen that allows the user to select to print the meeting material or to output as an electronic file (save in a USB memory)) (S95). CPU 11 then determines whether a specific meeting is selected by the user from among the fourth type of meetings within the above-noted certain period of time, and whether to save the material used in that meeting in a USB memory is selected by the user (S97). If a specific meeting is selected from among the fourth type of meetings within the above-noted certain period of time and if to save the material used in that meeting in a USB memory is selected (YES in S97), CPU 11 obtains data of the meeting material via network 140 from the location designated in the "meeting material save location" of the meeting information of the selected meeting and saves the obtained data in a USB memory (S99). The process then ends.

If a specific meeting is not selected from among the fourth type of meetings within the above-noted certain period of time or if to save in a USB memory is not selected in step S97 (NO in S97), it is determined whether a specific meeting is selected by the user from among the fourth type of meetings within the above-noted certain period of time and whether to print the material used in that meeting is selected by the user (S101). If a specific meeting is selected by the user from among the fourth type of meetings within the above-noted certain period of time and if to print the material used in that meeting is selected by the user (YES in S101), CPU 11 obtains data of the meeting material via network 140 from the location designated in the "meeting material save location" of the meeting information of the selected meeting and instructs the MFP 110 that has performed authentication to print the meeting material (S103). The process then ends. If a specific meeting is not selected by the user from among the fourth type of meetings within the above-noted certain period of time or if to print the material is not selected by the user in step S101 (NO in S101), CPU 11 returns to step S93 and determines again whether a USB memory is connected to the MFP 110 that has performed authentication.

If a USB memory is not connected in step S93 (NO in S93), CPU 11 displays, on liquid crystal display 31 of operation panel 16, a list of the scheduled meetings (the fourth type of meetings) in which the user is included in the prospective participants, for a certain period of time (S105). CPU 11 then determines whether a specific meeting is selected by the user from among the fourth type of meetings within the above-noted certain period of time (S107). If a specific meeting is selected from among the fourth type of meetings within the above-noted certain period of time (YES in S107), CPU 11 obtains data of the meeting material via network 140 from the location designated in the "meeting material save location" of the meeting information of the selected meeting and instructs the MFP 110 that has performed authentication to print the meeting material (S103). The process then ends. If a specific meeting is not selected by the user from among the fourth type of meetings within the above-noted certain period of time (NO in S107), CPU 11 returns to step S93 and determines again whether a USB memory is connected to the MFP 110 that has performed authentication.

As described above, the process 4 is a process performed in the case where there exists a meeting which the user is scheduled to attend, of which meeting time (reservation time) does not include the present time, and of which meeting place included in the meeting information differs from the installation place of the MFP that has performed authentication (if there is no match for meeting place nor for meeting time in the meeting information). In this process, a list of scheduled future meetings for the user is displayed on the operation panel, and if the user selects output for a particular meeting, the material used in that meeting is output (printed) by the MFP that has performed authentication.

FIG. 21 shows an example of a screen appearing on the liquid crystal display of the operation panel in step S95 in FIG. 20. FIG. 21 and FIG. 22 show the screens in the case where the authenticated user is "A."

Referring to FIG. 21, in step S95 in FIG. 20, liquid crystal display 31 of operation panel 16 displays a message "Which meeting material do you want to save in USB memory?" to allow the user to select a meeting material to be output. Along with this message, the meeting name and the meeting date and time are displayed for each of eight meetings shown in FIG. 17. The meeting names are associated with "GO" buttons 211-218 for executing output of the materials to be used in the meetings (in FIG. 21, GO buttons 216-218 are hidden). In FIG. 21, there are as many as eight meetings to be displayed and they cannot be included in a single screen. Thus, a knob 235a of scroll bar 235 is moved up and down to scroll the display region.

Liquid crystal display 31 of operation panel 16 further displays "Paper Printout" output form button 231 for selecting to print out the meeting material and "Save in USB memory" output form button 233 for selecting to save the meeting material in a USB memory.

In the state in which the screen in FIG. 21 is displayed, if any one of GO buttons 211-218 is pressed by the user within a certain period of time, and if output form button 231 or 233 is pressed by the user, the material used in the meeting corresponding to the pressed GO button is output in the output form corresponding to the pressed output form button, at the MFP 110 that has performed authentication.

FIG. 22 shows an example of a screen appearing on the liquid crystal display of the operation panel in step S105 in FIG. 20.

Referring to FIG. 22, in step S105 in FIG. 20, a USB memory is not connected to the MFP 110 that has performed authentication, and the meeting material thus cannot be saved in USB. Therefore, liquid crystal display 31 of operation panel 16 displays a message "Which meeting material do you want to print out?" to allow the user to select a meeting material to be printed. Liquid crystal display 31 of operation panel 16 does not display "Paper Printout" output form button 231 and "Save in USB memory" output form button 233 in FIG. 21. Except for this, the screen in FIG. 22 is similar to the screen in FIG. 21, and therefore the description thereof will not be repeated.

In the state in which the screen in FIG. 22 is displayed, if any one of PRINT buttons 211-218 is pressed by the user within a certain period of time, the material used in the meeting corresponding to the pressed PRINT button is printed by the MFP 110 that has performed authentication.

Effect of Embodiments

In accordance with the present embodiment, even when the user obtains a meeting material on his own in order to avoid unnecessary print of the meeting material, processing is varied depending on the place or time (present time) of the user's operation, so that the user can obtain the meeting material with a simple operation. More specifically, when the user has a scheduled meeting on the day, the user can obtain the material of the meeting he is scheduled to attend by performing authentication at MFP in any place without selecting a meeting from the list of the scheduled meetings. When the user has a scheduled meeting on another day, a screen to allow output of the material of that meeting is displayed, so that the desired material can be output easily.

When the user has a scheduled meeting on the day and performs authentication at the MFP in the meeting room for the scheduled meeting, and if the printing of the material by the MFP that has authenticated will not be completed in time for the start of the meeting, the material is automatically saved as an electronic file in a USB memory or the like. If output as electronic data is not possible, the operation panel displays available MFP, so that the printing can be done by another MFP. Therefore, the user can obtain the material promptly even if the MFP installed in the meeting room where the meeting is held is busy.

When the screen to select an MFP for printing the material is displayed, the remaining time before the start of the meeting and the predicted print completion time at the MFP are additionally displayed, so that the user can print the meeting material promptly by selecting a suitable MFP.

[Others]

In the present embodiment, the material output system has the configuration shown in FIG. 1. However, any configuration of the material output system can be employed. For example, the number of MFP and PC connected to the network is not limited. The meeting management server may not be present and an MFP or PC may perform the function of the meeting management server. The PC may not be present and the meeting information and the meeting materials may be created by the meeting organizer from the PC as the meeting management server.

In the present embodiment, data of the material used in a meeting is saved in the image storage memory of MFP 110c. However, the material used in a meeting may be saved in any location. The data of the material used in a meeting may be saved, for example, into the image storage memory of another MFP, may be saved in HDD of PC 130, may be saved in HDD 101 of meeting management server 100, or may be saved in a recording medium such as a USB memory connected to PC 130 or the like.

In the present embodiment, the program for the material output processing is stored in program ROM 12 of MFP 110. However, the program for the material output processing may be stored in any location. For example, the program may be stored in image storage memory 17 of MFP 110, may be stored in ROM 103 or HDD 101 of meeting management server 100, or may be saved in ROM 133 or HDD 131 of PC 130.

In the present embodiment, the data of the material used in a meeting is saved in the image storage memory of MFP 110c. However, the material used in a meeting may be saved in any location. The data of the material used in a meeting may be saved, for example, in the image storage memory of another MFP, may be saved in HDD 131 of PC 130, may be saved in HDD 101 of meeting management server 100, or may be saved in a recording medium such as a USB memory connected to PC 130 or the like.

In the present embodiment, meeting information IF1, MFP information IF2, and personal identification information IF3 each are saved in HDD 101 of meeting management server 100. However, meeting information IF1, MFP information IF2, and personal identification information IF3 each may be saved in any location. Meeting information IF1, MFP information IF2, and personal identification information IF3 each may be saved, for example, in image storage memory 17 of any MFP 110, may be saved in HDD 131 of PC 130, or may be saved in a recording medium such as a USB memory connected to PC 130 or the like. The number of pieces of information included in meeting information IF1, MFP information IF2, and personal identification information IF3 is not limited.

Only the organizer of the meeting and the administrator of the material output system may be permitted to view or edit meeting information IF and/or a material used in a meeting, and only the person authorized by the administrator of the material output system may be permitted to view or edit MFP information IF2 and/or personal identification information IF3.

Meeting management server 100 may set the time period from a certain time (for example 30 minutes) before the start of the meeting to the end of the meeting, as the meeting room use time, rather than setting the meeting room reservation time as the meeting room use time. In this case, the meeting information at least includes the time period from the start to the end of the meeting and does not have to include the meeting room reservation time.

In the present embodiment, the output form of the material used in a meeting is selected between paper printout and electronic data. However, the output form of the material used in a meeting may be only paper printout.

The processing in the present embodiment may be performed by either software or hardware circuitry.

In the present embodiment, an electronic file is saved in a USB memory. However, an electronic file may be saved in a recording medium such as a Floppy® disk, CD-ROM, DVD-ROM, BD-ROM, MO, or memory card.

In accordance with the foregoing embodiment, a material can be distributed promptly to a participant in a meeting.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A material output system comprising:
    a server comprising storage medium, said server storage medium storing at least one piece of meeting information, the meeting information including prospective participants in a meeting, a meeting room where said meeting is held, a meeting room use time for said meeting, and a storage location to save material used in said meeting;
    a plurality of output hardware units configured to output said material, each said output hardware unit being located in a meeting room and comprising a processor, a display unit, and authentication hardware authenticating a user;
    where said server storage medium further stores a correspondence between said plurality of output hardware units and meeting rooms corresponding to said plurality of output hardware units;
    said output hardware unit that performed authentication of the user being instructed to output material saved in the storage location of the meeting information when i) it is determined based on said meeting information that said user authenticated by said authentication hardware is one of the prospective participants for said meeting and it is determined based on said meeting information that the present date and time is included in the meeting room use time for said meeting, and ii) it is determined based on said correspondence stored in said server storage medium that said output hardware unit that performed authentication of the user corresponds to the meeting room where said meeting is held;
    said display unit displaying a screen to allow output of material saved in the storage location for at least one piece of meeting information when said authenticated user is one of a plurality of prospective participants in the meeting information for a meeting when it is determined that said server storage medium does not store meeting information where said authenticated user is one of a plurality of prospective participants in a meeting, where a meeting room corresponded with said output hardware unit has performed authentication of the user is the meeting room where the meeting is held, and where the present date and time is included in a meeting room use time in the meeting information for the meeting; and
    said output hardware unit that has performed authentication to output material being instructed, based on an instruction from said authenticated user, to save in the storage location of the meeting information for a meeting when said screen to allow output of material is displayed on said display unit and when said authenticated user is one of the prospective participants in the meeting information for a meeting.

2. The material output system according to claim 1, wherein when said output hardware unit is not instructed to output an electronic file from said output hardware unit that has performed authentication, said display unit displays a screen to allow said authenticated user to select an output hardware unit for printing, and said output hardware unit giving an instruction to print to the output hardware unit selected with said screen.

3. The material output system according to claim 2, wherein when said screen to select an output hardware unit for printing is displayed, said display unit additionally displays a remaining time before the start of a meeting and a predicted time taken to complete printing.

4. The material output system according to claim 1, wherein when said output hardware unit predicts that printing from said output hardware unit that has performed authentication will not be completed in time for the start of a meeting, said display unit displays a screen to allow said authenticated user to select an output hardware unit for printing, and said output hardware unit giving an instruction to print to the output hardware unit selected with said screen.

5. The material output system according to claim 1, wherein when said output hardware unit predicts that printing from said output hardware unit that has performed authentication will not be completed in time for the start of a meeting and when an electronic file can be output from said output hardware unit that has performed authentication, said output hardware unit gives an instruction to output an electronic file to said output hardware unit that has performed authentication.

6. The material output system according to claim 1, wherein said display unit displays a screen to allow said authenticated user to select an output hardware unit for outputting material saved in the associated storage location for that meeting information when it is determined that i) said server storage medium does not store meeting information where said authenticated user is one of a plurality of prospective participants in a meeting, where the meeting room corresponded with said output hardware unit that authenticated the user is the meeting room where the meeting is held, and the present date and time is included in a meeting room use time in the meeting, and ii) said server storage medium has stored meeting information in which said authenticated user is one of a plurality of prospective participants in a meeting and where the present date and time is included in a meeting use time in the meeting information for the meeting, and said output hardware unit gives an instruction to output to the output hardware unit selected with said screen.

7. The material output system according to claim 6, wherein when said output hardware unit does not instruct output of an electronic file from said output hardware unit that has performed authentication, said display unit displays a screen to allow said authenticated user to select an output hardware unit for printing, and said output hardware unit gives an instruction to print to the output hardware unit selected with the screen.

8. The material output system according to claim 7, wherein when said screen to select an output hardware unit for printing is displayed, said display unit additionally displays a remaining time before the start of a meeting and a predicted time taken to complete printing.

9. The material output system according to claim 6, wherein said display unit displays a screen to allow output of material saved in the associated storage location for that meeting information when it is determined that i) said server storage medium does not store meeting information where said authenticated user is one of a plurality of prospective participants in a meeting and where the present date and time is included in a meeting room use time in the meeting, and ii) said server storage medium has stored meeting information where said authenticated user is one of a plurality of prospective participants in a meeting and where a meeting room corresponding to said output hardware unit that performed authentication is the meeting room where said meeting is held.

10. The material output system according to claim 9, wherein said display unit displays a screen to allow output of material saved in the associated storage location for that meeting information when it is determined that i) said server storage medium does not store meeting information where said authenticated user is one of a plurality of prospective participants in a meeting and where the meeting room corresponded with said output hardware unit that authenticated the user is the meeting room where the meeting is held, and ii) said server storage medium has stored meeting information where said authenticated user is one of a plurality of prospective participants in a meeting.

11. The material output system according to claim 6, wherein when said output hardware unit can allow output of an electronic file from said output hardware unit that has performed authentication, said display unit displays a screen to allow said authenticated user to select an output form between an electronic file and a printout, and said output hardware unit gives an instruction to output in the selected output form.

12. The material output system according to claim 11, wherein when said screen to select an output form is displayed, said display unit additionally displays a remaining time before the start of a meeting and a predicted time taken to complete printing.

13. A material output apparatus comprising a processor and a display unit:

said processor configured to obtain at least one piece of meeting information, the meeting information including prospective participants in a meeting, a meeting room where said meeting is held, a meeting room use time in said meeting, and a storage location to save material used in said meeting;

authentication hardware performing authentication of a user;

an output hardware unit outputting said material, the output hardware unit located in a meeting room;

said processor further configured to obtain a correspondence between said output hardware unit and a meeting room corresponding to said output hardware unit;

said processor further configured to instruct said output hardware unit to output material saved in the associated storage location for that meeting information when said processor obtains meeting information where a user authenticated by said authentication hardware is one of a plurality of prospective participants in a meeting, where the meeting room corresponded with said output hardware unit is the meeting room where the meeting is held, and where the present date and time is included in a meeting room use time in the meeting;

said display unit displaying a screen to allow output of material saved in the associated storage location for at least one piece of meeting information in which said authenticated user is one of a plurality of prospective participants in a meeting when said processor does not obtain meeting information where said authenticated user is one of a plurality of prospective participants in a meeting, where the meeting room corresponded with said output hardware unit is the meeting room where the meeting is held, and where the present date and time is included in a meeting room use time in the meeting; and said processor instructing said output hardware unit to output material saved in the storage location of the meeting information for a meeting when said display unit displays said screen to allow output of material is displayed and when, for at least one piece of meeting information, said authenticated user is one of a plurality of prospective participants in a meeting, based on an instruction from said authenticated user.

14. A method for controlling a material output system comprising the steps of:

obtaining at least one piece of meeting information, the meeting information including prospective participants in a meeting, a meeting room where said meeting is held, a meeting room use time in said meeting, and a storage location to save material used in said meeting;

performing authentication of a user at one of a plurality of output hardware units configured to output said material;

obtaining a correspondence between said plurality of output hardware units and meeting rooms corresponded to said plurality of output hardware units;

instructing said output hardware unit that has performed authentication to output material saved in the associated storage location for that meeting information when said step of obtaining at least one piece of meeting information obtains, based on said meeting information and said correspondence meeting information where a user authenticated in said step of performing authentication is one of a plurality of prospective participants in a meeting, where the meeting room associated with an output hardware unit has performed authentication among said plurality of output hardware units is the meeting room where the meeting is held, and where the present date and time is included in a meeting room use time in the meeting;

displaying a screen to allow output of a material saved in the associated storage location for at least one piece of meeting information in which said authenticated user is one of a plurality of prospective participants in a meeting, when said step of obtaining at least one piece of meeting information does not obtain meeting information where said authenticated user is one of a plurality of prospective participants in a meeting, where the meeting room associated with said output hardware unit that has performed authentication is the meeting room where the meeting is held, and where the present date and time is included in a meeting room use time in the meeting; and instructing said output hardware unit that has performed authentication to output material saved in the associated storage location for at least one piece of meeting information where said authenticated user is one of a plurality of prospective participants in a meeting, based on an instruction from said authenticated user, when said screen to allow output of material is displayed.

15. A material output apparatus comprising a processor and a display unit:

said processor configured to obtain at least one piece of meeting information, the meeting information including prospective participants in a meeting, a meeting room where said meeting is held, a meeting room use time in said meeting, and a storage location to save material used in said meeting;

authentication hardware performing authentication of a user;

an output hardware unit outputting said material, the output hardware unit located in a meeting room;

said processor further configured to obtain a correspondence between said output hardware unit and a meeting room corresponding to said output hardware unit;

said processor further configured to instruct said output hardware unit to output material saved in the associated storage location for that meeting information when said processor obtains meeting information where a user authenticated by said authentication hardware is one of a plurality of prospective participants in a meeting, where the meeting room corresponded with said output hardware unit is the meeting room where the meeting is held, and where the present date and time is included in a meeting room use time in the meeting;

said display unit displaying a screen to allow output of material saved in the associated storage location for at least one piece of meeting information in which said authenticated user is one of a plurality of prospective participants in a meeting when said processor does not obtain meeting information where said authenticated user is one of a plurality of prospective participants in a meeting, where the meeting room corresponded with said output hardware unit is the meeting room where the meeting is held, and where the present date and time is included in a meeting room use time in the meeting;

said display unit further configured to display the screen to allow said authenticated user to select an output hardware unit for printing among a plurality of material output apparatus; and said processor further configured to send an instruction to print the material saved in the storage location of the meeting information for the authenticated user to the output hardware unit selected on the screen.

16. A non-transitory computer readable medium storing a program controlling a material output apparatus comprising a processor and a display unit, the program being executed by the processor to perform the steps of:

obtaining at least one piece of meeting information, the meeting information including prospective participants in a meeting, a meeting room where said meeting is held, a meeting room use time in said meeting, and a storage location to save material used in said meeting;

performing authentication of a user;

outputting said material from an output hardware unit located in a meeting room;

obtaining a correspondence between said output hardware unit and a meeting room corresponding to said output hardware unit;

instructing said output hardware unit to output material saved in the associated storage location for that meeting information when said processor obtains meeting information where an authenticated user is one of a plurality of prospective participants in a meeting, where the meeting room corresponded with said output hardware unit is the meeting room where the meeting is held, and where the present date and time is included in a meeting room use time in the meeting;

displaying a screen to allow output of material saved in the associated storage location for at least one piece of meeting information in which said authenticated user is one of a plurality of prospective participants in a meeting when said processor does not obtain meeting information where said authenticated user is one of a plurality of prospective participants in a meeting, where the meeting room corresponded with said output hardware unit is the meeting room where the meeting is held, and where the present date and time is included in a meeting room use time in the meeting;

displaying the screen to allow said authenticated user to select an output hardware unit for printing among a plurality of material output apparatus; and sending an instruction to print the material saved in the storage location of the meeting information for the authenticated user to the output hardware unit selected on the screen.

\* \* \* \* \*